United States Patent
Kataoka

(10) Patent No.: US 10,217,040 B2
(45) Date of Patent: Feb. 26, 2019

(54) CONTACTLESS INFORMATION MEDIUM

(71) Applicant: TOPPAN PRINTING CO., LTD., Tokyo (JP)

(72) Inventor: Shin Kataoka, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/811,755

(22) Filed: Nov. 14, 2017

(65) Prior Publication Data

US 2018/0068213 A1 Mar. 8, 2018

Related U.S. Application Data

(63) Continuation of application No. PCT/JP2016/062275, filed on Apr. 18, 2016.

(30) Foreign Application Priority Data

Jun. 2, 2015 (JP) .................................. 2015-112425
Jun. 18, 2015 (JP) .................................. 2015-122778

(51) Int. Cl.
*G06K 19/06* (2006.01)
*G06K 19/077* (2006.01)
*G06K 19/07* (2006.01)

(52) U.S. Cl.
CPC ... *G06K 19/07749* (2013.01); *G06K 19/0726* (2013.01)

(58) Field of Classification Search
CPC .............. G06K 7/10722; G06K 7/1413; G06K 7/1417; G06K 19/07749; G06K 19/0726

(Continued)

(56) References Cited

U.S. PATENT DOCUMENTS 8,528,827 B2 * 9/2013 Aoki .................... G06K 19/077
  235/487
9,747,481 B1 * 8/2017 Bondarenko .......... G06Q 10/00
(Continued)

FOREIGN PATENT DOCUMENTS

JP 2000-059260 2/2000
JP 2004-355442 12/2004
(Continued)

OTHER PUBLICATIONS

International Search Report issued in International Patent Application No. PCT/JP2016/062275 dated Jun. 28, 2016.
(Continued)

*Primary Examiner* — Karl D Frech
(74) *Attorney, Agent, or Firm* — Foley & Lardner LLP

(57) ABSTRACT

A contactless communication medium includes a film base, an antenna coil disposed on a top surface of the film base and formed in a rectangular spiral shape, an IC chip performing wireless communication processing via the antenna coil, first plate electrodes connected to an inner end and an outer end of the antenna coil, and second plate electrodes disposed on a rear surface of the film base so as to be opposite to the first plate electrodes in the thickness direction of the film base. The first plate electrodes and the second plate electrodes have a first electrode portion and a second electrode portion respectively extending along a long side direction and a short side direction of the antenna coil so as to be adjacent to an inner periphery or an outer periphery of the antenna coil when viewed perpendicular to the film base.

25 Claims, 22 Drawing Sheets

(58) Field of Classification Search
USPC .............. 235/385, 380, 375, 492, 487, 488
See application file for complete search history.

(56) References Cited

U.S. PATENT DOCUMENTS

| | | | |
|---|---|---|---|
| 9,904,829 B1* | 2/2018 | Bondarenko | G06K 7/1417 |
| 2009/0108974 A1 | 4/2009 | Raggam et al. | |
| 2011/0132988 A1* | 6/2011 | Watanabe | G06K 19/0723 |
| | | | 235/492 |
| 2013/0135172 A1 | 5/2013 | Ito | |

FOREIGN PATENT DOCUMENTS

| | | |
|---|---|---|
| JP | 2011-077106 A | 4/2011 |
| JP | 2011-135307 | 7/2011 |
| WO | WO-2011/108339 | 9/2011 |
| WO | WO-2012/014975 | 2/2012 |

OTHER PUBLICATIONS

Japanese Office Action dated Aug. 14, 2018 in corresponding application No. 2015-112425.
European Patent Office, "Communication with Supplementary European Search Report," issued in connection with European Patent Application No. 16802932.0, dated Jan. 3, 2019.

* cited by examiner

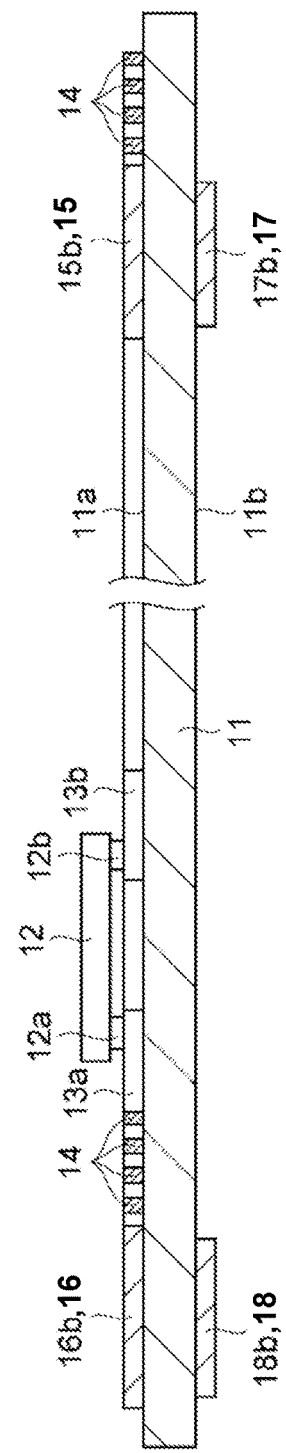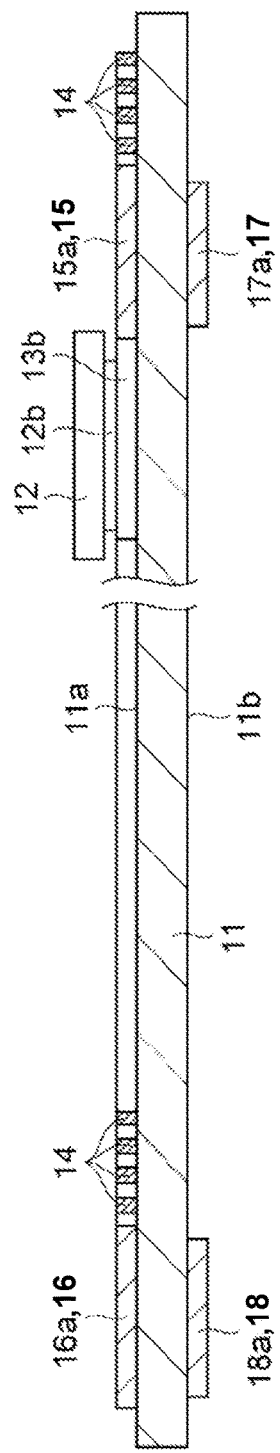

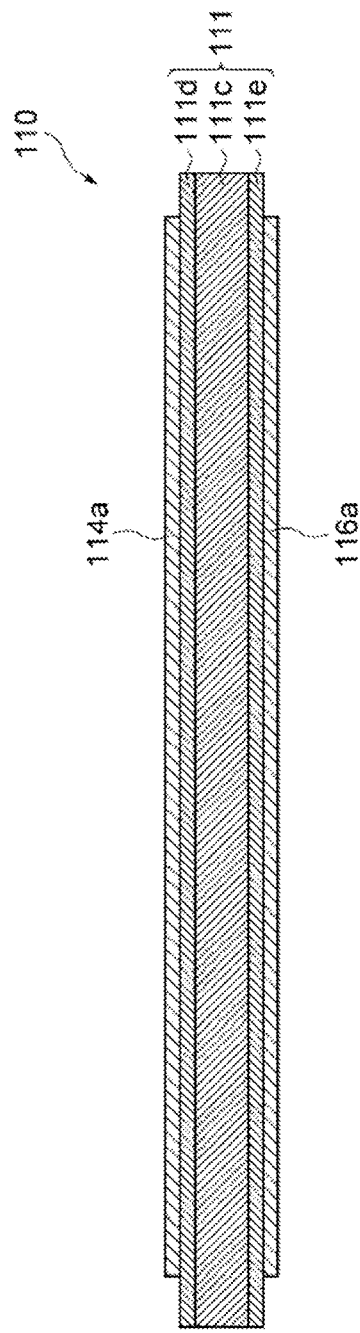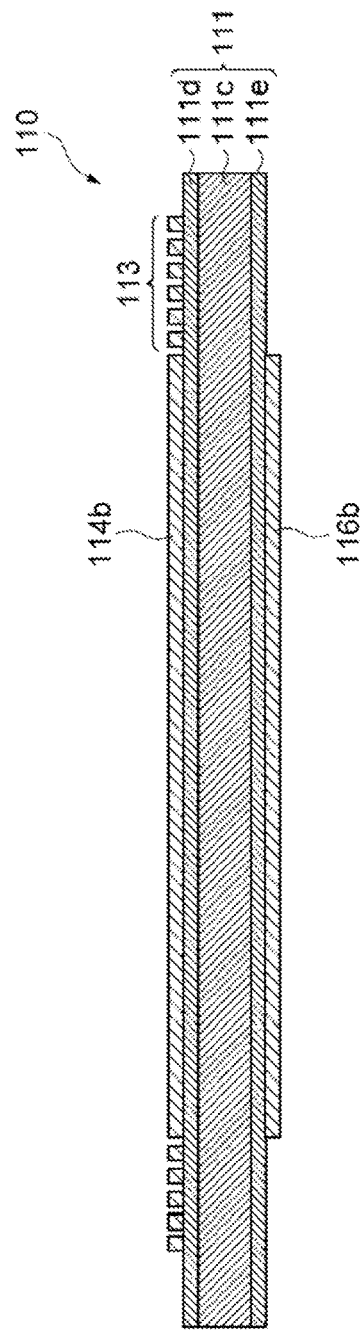

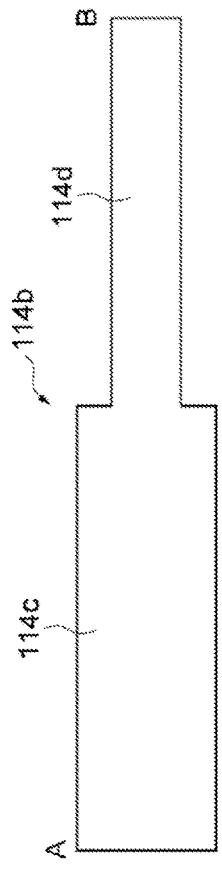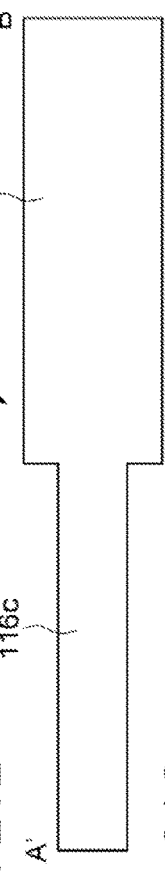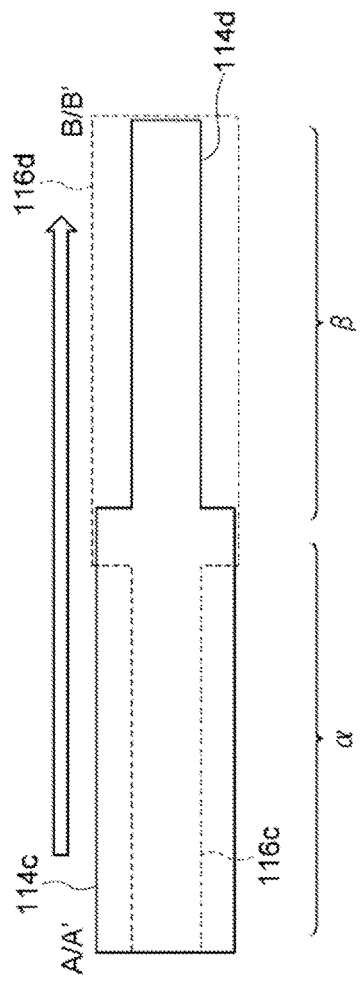
FIG. 21A
FIG. 21B
FIG. 21C

CONTACTLESS INFORMATION MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/062275, filed on Apr. 18, 2016, which is based upon and claims the benefit of priority of Japanese Patent Application No. 2015-112425, filed on Jun. 2, 2015, and Japanese Patent Application No. 2015-122778, filed on Jun. 18, 2015, the entireties of which are hereby incorporated by reference.

TECHNICAL FIELD

The present invention relates to a contactless information medium.

BACKGROUND

Patent Document 1 discloses an example of an RFID medium (a contactless information medium) such as a contactless IC card which performs wireless communication using signals in an HF band (for example, 13.56 MHz). An antenna pattern of an antenna coil of such an RFID medium can be designed in any shape as long as the functional requirements for performing wireless communications with external devices are met.

Certain restrictions may be imposed on the antenna pattern in order to meet the requirements of a shape or a specific standard of an object to which the RFID medium is to be installed. For example, in the standard specified as ISO/IEC 14443-1, Class 1, an area where an antenna pattern can be arranged is set in order to provide an opening (a region having no wiring pattern) formed inside an antenna coil. Specifically, in the above standard, the area where the antenna pattern can be arranged is set to be an annular area obtained by removing, from a rectangular region having a length of 49 mm and a width of 81 mm, a substantially rectangular region having a length of 34 mm and a width of 64 mm (this rectangular region having corners rounded with R3 mm) and centered in the rectangular region.

CITATION LIST

Patent Literature

Patent Document 1: JP 2004-355442 A

SUMMARY OF THE INVENTION

Technical Problem

In such an RFID medium, a capacitance portion capable of propagating high-frequency signals using parallel plate electrodes may be provided in a circuit. In that case, a wiring pattern to connect the parallel plate electrodes to an antenna coil is necessary, and therefore it may be difficult to meet the requirements of the above standard. For example, when parallel plate electrodes are disposed substantially centrally in an opening formed inside an antenna coil as with the examples disclosed in Patent Document 1, the requirements of the above standard cannot be met. Further, when the requirements of the above standard are not met and the area of the opening of the antenna coil is insufficient, the radiation efficiency of the antenna may decrease, and therefore it is recommended that the wiring pattern be preferably accommodated within the annular area as set according to the above standard to provide the opening of the antenna coil.

To solve the problem above, an object of the present invention is to provide a contactless information medium having parallel plate electrodes and designed to have an opening of an antenna coil.

Solution to Problem

According to an aspect of the present invention, the contactless information medium includes a film base, an antenna coil, an IC chip, a first plate electrode, and a second plate electrode. The antenna coil is disposed on a first surface of the film base, and formed in a spiral shape to perform wireless communication with an external device. The IC chip is disposed on the first surface of the film base, connected to the antenna coil via an IC chip-mounted portion, and performs wireless communication processing via the antenna coil. The first plate electrode is disposed on the first surface of the film base, and connected to at least one of an inner end and an outer end of the antenna coil. The second plate electrode is disposed on a second surface of the film base so as to be opposite to the first plate electrode in the thickness direction of the film base. Further, in the contactless information medium, each of the first plate electrode and the second plate electrode has a first electrode portion and a second electrode portion. The first electrode portion and the second electrode portion respectively extend along a first side direction of the antenna coil and a second side direction intersecting with the first side direction so that the first and second electrode portions are adjacent to an inner periphery or an outer periphery of the antenna coil when viewed perpendicular to the film base. Alternatively, the first and second plate electrodes are disposed along greater than or equal to one-third of the entire length of the inner periphery or the outer periphery of the antenna coil so as to be adjacent to the inner periphery or the outer periphery of the antenna coil when viewed perpendicular to the film base.

In the contactless information medium according to another aspect of the present invention, a capacitance portion capable of propagating high frequency signals is formed of the first and second plate electrodes disposed on opposite sides of the film base. Further, the first plate electrode and the second plate electrode have a first electrode portion and a second electrode portion. The first electrode portion extends along a first side direction (for example, a long side direction) of the antenna coil so as to be adjacent to an inner periphery or an outer periphery of the antenna coil formed, for example, in a rectangular spiral shape when viewed perpendicular to the film base. The second electrode portion extends along a second side direction (for example, a short side direction) of the antenna coil. This arrangement allows the provision of plate electrodes while providing an opening of the antenna coil (a region having no wiring pattern), under the constraints imposed by the limited outer dimensions of the contactless information medium.

In the contactless information medium according to another aspect of the present invention, a capacitance portion capable of propagating high frequency signals is formed with the first plate electrode and the second plate electrode disposed on opposite sides of the film base. Further, the first and second plate electrodes are disposed along greater than or equal to one-third of the entire length of the inner periphery or the outer periphery of the antenna coil so as to be adjacent to the inner periphery or the outer periphery of the antenna coil formed in a spiral shape when viewed perpendicular to the film base. This arrangement allows having plate electrodes while providing an opening of the antenna coil, under the constraints imposed by the limited outer dimensions of the contactless information medium.

In the contactless information medium, the first plate electrode may have a first inner plate electrode connected to the inner end of the antenna coil, and a first outer plate electrode connected to the outer end of the antenna coil. The second plate electrode may have a second inner plate electrode opposite to the first inner plate electrode in the thickness direction of the film base, and a second outer plate electrode opposite to the first outer plate electrode in the thickness direction of the film base. The first outer plate electrode may be disposed on the opposite side of the first inner plate electrode with respect to a center point or center line on the plane of the film base. In that case, the first plate electrode and the like are arranged well-balanced on the surface of the film base, enabling the contactless information medium to have parallel plate electrodes and an opening of the antenna coil under the constraints imposed by the limited outer dimensions of the contactless information medium.

In the contactless information medium, the first plate electrode may have a first inner plate electrode connected to the inner end of the antenna coil, and a first outer plate electrode connected to the outer end of the antenna coil. The second plate electrode may have a second inner plate electrode opposite to the first inner plate electrode in the thickness direction of the film base, and a second outer plate electrode opposite to the first outer plate electrode in the thickness direction of the film base. Each of the first inner plate electrode and the first outer plate electrode may have the first electrode portion and the second electrode portion. In this case, the first plate electrode and the like are arranged well-balanced on the surface of the film base, thus enabling the contactless information medium to have parallel plate electrodes and an opening of the antenna coil, under the constraints imposed by the limited outer dimensions of the contactless information medium.

The contactless information medium may further include a jumper portion connecting the second inner plate electrode to the second outer plate electrode on the second surface of the film base. With the second inner plate electrode connected to the second outer plate electrode with the jumper portion, the second inner plate electrode and the second outer plate electrode are disposed on opposite sides of the film base without the plate electrodes directly connecting to each other, and a capacitance portion capable of propagating high-frequency signals can be provided in a circuit. This enables an electrical connection between electrodes to be made with greater reliability because propagation of signals by the capacitance portion will not be disturbed even if the film base expands when heated.

In the contactless information medium, the pair of inner plate electrodes consisting of the first inner plate electrode and the second inner plate electrode, and the pair of outer plate electrodes consisting of the first outer plate electrode and the second outer plate electrode may be arranged such that, when viewed perpendicular to the film base, a portion of the antenna coil along which the pair of the inner plate electrodes are disposed is different from a portion of the antenna coil along which the pair of the outer plate electrodes are disposed. In that case, the pair of the inner plate electrodes inside the antenna coil, and the pair of the outer plate electrodes outside the antenna coil are arranged such that they do not share the same portions of the antenna coil.

In other words, the pair of the inner plate electrodes and the pair of the inner plate electrodes are arranged so that the two pairs do not adjoin each other and do not sandwich the same portion of the antenna coil therebetween. Thus, the antenna coil, the pair of the inner plate electrodes, and the pair of the outer plate electrodes are disposed on the film base in a balanced manner. Specifically, the antenna coil and the plate electrodes can be adequately arranged in an equally spaced and annular antenna pattern arranging area defined in a standard (for example, ISO/IEC 14443-1, class 1) and the like.

In the contactless information medium, at least one of the pair of inner plate electrodes consisting of the first inner plate electrode and the second inner plate electrode, and the pair of outer plate electrodes consisting of the first outer plate electrode and the second outer plate electrode may be arranged such that an electric current flows in the same direction as an electric current passing through the antenna coil. The number of coil turns can be effectively increased by enabling at least one of the pair of inner plate electrodes and the pair of outer plate electrodes to function as a radiating element that passes an electric current in the same direction as an electric current passing through the antenna coil. Thus, it is possible to reduce the number of turns (that is, the area of the antenna pattern) required of the antenna coil due to the number of coil turns effectively increased, thereby increasing the area of the opening of the antenna coil.

In the contactless information medium, the antenna coil has any one of a circular shape, an elliptic shape, and a polygonal shape including a rectangular shape, as examples.

In the contactless information medium, the IC chip mounting portion may be disposed outside the antenna coil when viewed perpendicular to the film base. When relatively large parts such as the IC chip mounting portion and the IC chip mounted on the IC chip mounting portion are disposed outside the antenna coil, the area of the opening of the antenna coil can be increased.

In the contactless information medium, the IC chip mounting portion may be disposed outside the antenna coil when viewed perpendicular to the film base, and the pair of outer plate electrodes consisting of the first outer plate electrode and the second outer plate electrode may be disposed, when viewed perpendicular to the film base, along the outer periphery of the antenna coil and the IC chip mounting portion. In that case, the plate electrodes can be disposed by effectively using an empty space outside the antenna coil on the film base.

In the contactless information medium, the first and second plate electrodes may be disposed on the film base such that one of the plate electrodes entirely covers the other plate electrode when viewed perpendicular to the film base. Further, in the contactless information medium, the first and second plate electrodes may be disposed on the film base such that, when viewed perpendicular to the film base, one of the plate electrodes entirely covers the other plate electrode in the first direction parallel to the surface of the film base, and the latter plate electrode entirely covers the former plate electrode in the second direction parallel to the surface of the film base and perpendicular to the first direction. With this arrangement of the plate electrodes, even if the second plate electrode is misaligned from the first plate electrode due to manufacturing tolerances and the like, capacitance of the parallel plates formed by the electrodes will not change, which reduces variations in electric characteristics of products.

In the contactless information medium, an antenna arranging region having a frame shape, where the antenna coil is disposed, is defined on the periphery of the first surface of the film base. The antenna arranging region may be located between the outer periphery of the film base and an antenna non-arranging region that covers about more than half of the entire area of the first surface and that is defined in the center of the first surface. Defining such an antenna arranging region enables the contactless information medium to have parallel plate electrodes and a required opening of the antenna coil (an antenna non-arranging region), under the constraints imposed by the limited outer dimensions of the contactless information medium.

In the contactless information medium, the first plate electrode may be disposed adjacent to the closest antenna coil such that the space between the first plate electrode and the inner periphery or the outer periphery of the antenna coil is 0.5 mm or less. This allows the first plate electrode and the antenna coil to be arranged with greater efficiency.

In the contactless information medium, the film base may include an intermediate base formed of a dielectric, a first dielectric layer for adjustment formed of a dielectric and formed on a first surface of the intermediate base, and a second dielectric layer for adjustment formed of a dielectric and formed on a second surface of the intermediate base. With such a three-layer structure, the thickness of the film base formed of dielectric material, namely the distance between the first and second plate electrodes, can be more easily adjusted, for example, by changing the thickness of the first or second dielectric layer. This allows easier adjustment of the capacitance of a capacitor formed by the first and second plate electrodes without changing the shape and the like of an electrode pattern of the plate electrodes constituting the capacitor. Further, in the contactless information medium, an electrical connection is made by a capacitor formed by the first plate electrode connected to the antenna coil and the second plate electrode disposed on the rear surface. This configuration enables more simpler production and inspection processes than if the start end and the finish end of the antenna coil were directly connected to the conductor pattern on the rear surface, and a more reliable electrical connection.

In the contactless information medium, the dielectric constants of the dielectrics constituting the first and second dielectric layers may be greater than or equal to the dielectric constant of the dielectric constituting the intermediate base. This configuration enables easier adjustment of the capacitance of the capacitor formed by the first and second plate electrodes even if the first and second dielectric layers are thin.

In the contactless information medium, the first and second dielectric layers may be thinner than the intermediate base. In that case, the dielectric layers for adjusting the capacitance of the capacitor made of the first and second plate electrodes are thin, which decreases or minimizes variations in total thickness of the film base in products.

In the contactless information medium, a dielectric material constituting the first and second dielectric layers may be the same as or different from a dielectric material constituting the intermediate base.

In the contactless information medium, the first and second dielectric layers may be formed by applying the dielectric material to the intermediate base followed by curing. This configuration enables easier adjustment of the thickness and the like of the first and second dielectric layers, thus allowing the capacitance of the capacitor made of the first and second plate electrodes to be more easily adjusted.

In the contactless information medium, the metal foil constituting the antenna coil may be thicker than the metal foil constituting the second plate electrode. In that case, the electrical resistance of the antenna coil is reduced, increasing the radiation efficiency of the antenna of the contactless information medium.

Advantageous Effects of the Invention

The present invention provides a contactless information medium designed to have an opening of an antenna coil and parallel plate electrodes.

BRIEF DESCRIPTION OF THE DRAWINGS

FIG. 1A is a top view of a contactless communication medium, showing its internal structure, while

FIG. 2A is a cross-sectional view of the contactless communication medium shown in FIG. 1A and FIG. 1B, taken along the line IIa-IIa, while FIG. 2B is a cross-sectional view of the contactless communication medium shown in FIG. 1A and FIG. 1B, taken along the line IIb-IIb.

FIG. 4A is a top view of a contactless communication medium, showing its internal structure, while

FIG. 5A is a top view of a contactless communication medium, showing its internal structure, while

FIG. 6A is a top view of a contactless communication medium, showing its internal structure, while

FIG. 7A is a top view of a contactless communication medium, showing its internal structure, while

FIG. 8A is a top view of a contactless communication medium, showing its internal structure, while

FIG. 9A is a top view of a contactless communication medium, showing its internal structure, while

FIG. 10A is a top view of a contactless communication medium, showing its internal structure, while

FIG. 11A is a top view of a contactless communication medium, showing its internal structure, while

FIG. 12A is a plan view of a contactless communication medium, showing an opening thereof, while

FIG. 13A is a top view of a contactless communication medium, showing its internal structure, while

FIG. 14A is a cross-sectional view of the contactless communication medium shown in FIG. 13A and FIG. 13B, taken along the line XIVa-XIVa, while FIG. 14B is a cross-sectional view of the contactless communication medium shown in FIG. 13A and FIG. 13B, taken along the line XIVb-XIVb.

FIG. 16A is a cross-sectional view of the contactless communication medium, showing another configuration thereof, while

FIG. 17A is a cross-sectional view of the contactless communication medium, showing still another configuration thereof, while

FIG. 18A is a top view of a contactless communication medium, showing its internal structure, while

FIG. 21A to FIG. 21C are diagrams showing another configuration of the contactless communication medium of the second modification. FIG. 21A shows a plate electrode on the top surface, FIG. 21B shows a plate electrode on the rear surface, and FIG. 21C shows the plate electrodes opposite to each other.

FIG. 22A shows a plate electrode on the top surface side, FIG. 22B shows a plate electrode on the rear surface side, and FIG. 22C shows the plate electrodes opposite to each other.

DESCRIPTION OF THE REPRESENTATIVE EMBODIMENTS

Figure 1A:
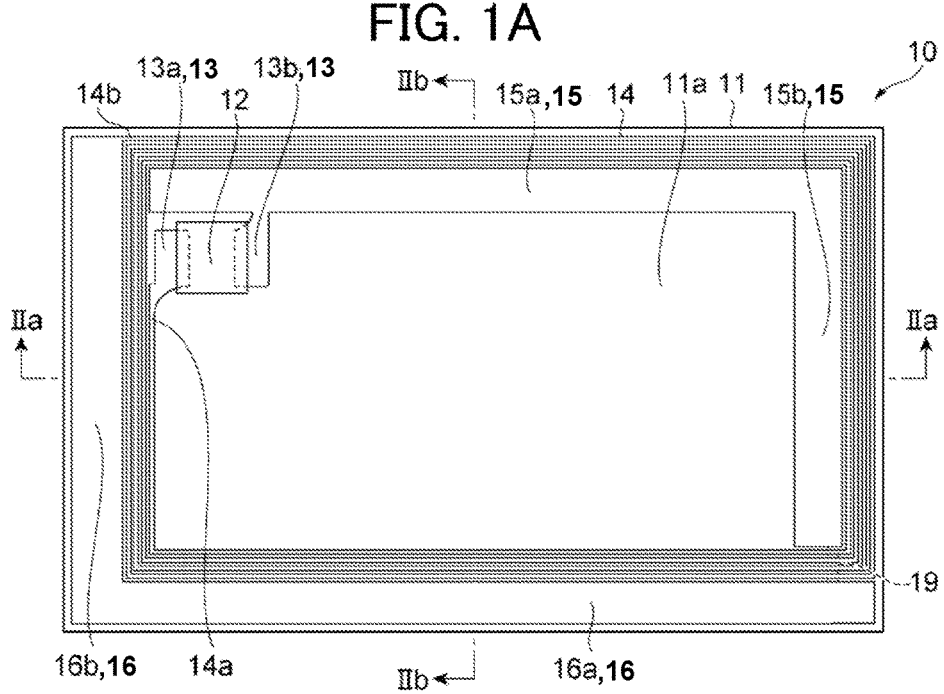

Embodiments of the present invention will be hereinafter described in detail with reference to the accompanying drawings. In the description of the drawings, like or equivalent elements are designated by like reference characters and will not be redundantly described. Also, it is to be understood that the embodiments described below are intended to be representative of the present invention. The present invention is not necessarily limited to the representative embodiments. One of skill in the art may be able to modify the embodiments below to nonetheless achieve the results of the present invention.

First Embodiment

Figure 3:
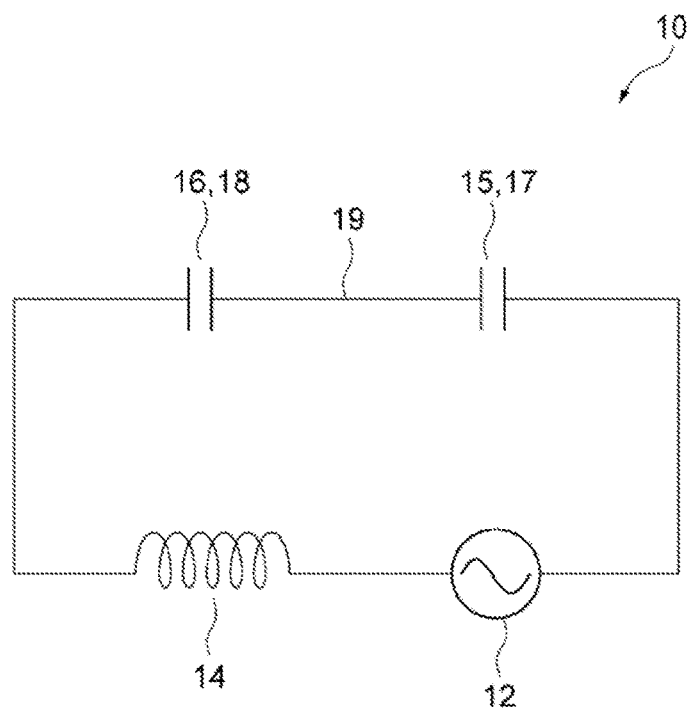
FIG. 3 is a circuit diagram showing an equivalent circuit of the contactless communication medium shown in FIG. 1A and FIG. 1B.

With reference to FIG. 1A to FIG. 3, a contactless communication medium of a first embodiment of the present invention will be described. FIG. 1A is a top view of the contactless communication medium, showing its internal structure, while FIG. 1B is a rear view thereof, according to the first embodiment of the present invention. FIG. 2A is a cross-sectional view of the contactless communication medium shown in FIG. 1A and FIG. 1B, taken along the line IIa-IIa, while FIG. 2B is a cross-sectional view of the contactless communication medium shown in FIG. 1A and FIG. 1B, taken along the line IIb-IIb. FIG. 3 is a circuit diagram showing an equivalent circuit of the contactless communication medium shown in FIG. 1A and FIG. 1B. FIG. 1B shows a rear side view of the contactless communication medium reversed with respect to its central longitudinal axis in the top view shown in FIG. 1A. The contactless communication medium is a contactless information medium capable of performing contactless communication with an external read/write device, such as a reader/writer, using signals primarily in the HF band, by applying RFID technology.

As shown in FIG. 1A to FIG. 2B, a contactless communication medium 10 has a rectangular film base 11. On a top surface (a first surface) 11a of the film base 11 are an IC chip 12, an IC chip mounting portion 13, an antenna coil 14, a first inner plate electrode 15, and a first outer plate electrode 16. On a rear surface (a second surface) 11b of the film base 11 are a second inner plate electrode 17, a second outer plate electrode 18, and a jumper wire (a jumper portion) 19.

The film base 11 is formed of materials having insulating properties and durability, for example, polyethylene naphthalate (PEN), polyethylene terephthalate copolymer (PET-G) and the like. Before machining, such as etching, a metal foil is laminated to both the front and rear surfaces 11a and 11b of the film base 11. These metal foils are etched, for example, to form the IC chip mounting portion 13, the antenna coil 14, the first plate electrodes 15 and 16, the second plate electrodes 17 and 18, and the jumper wire 19.

Figure 1B:
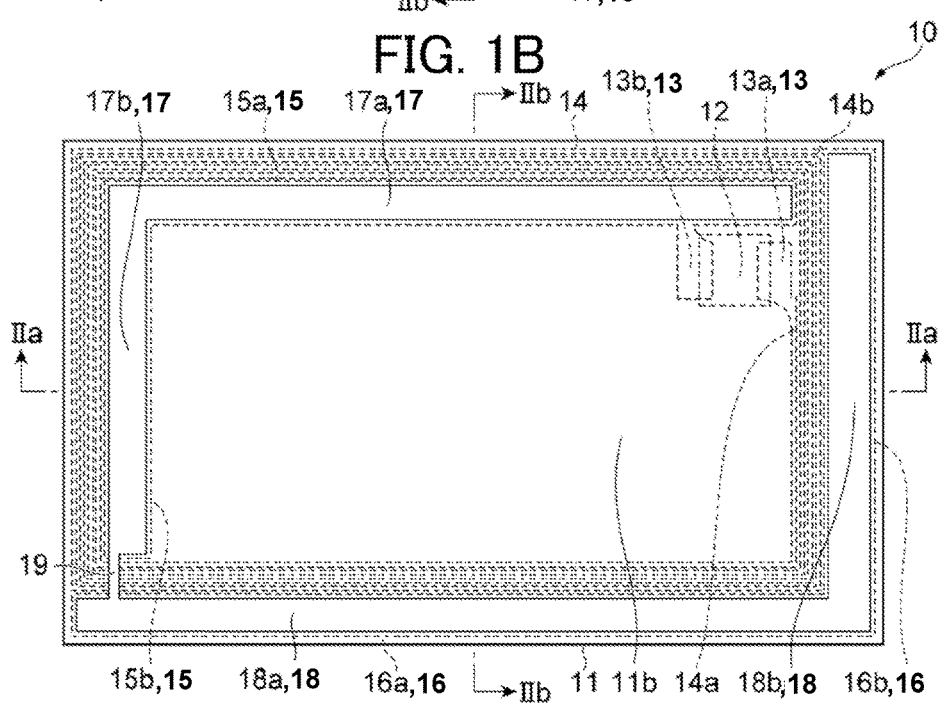
FIG. 1B is a rear view thereof, according to a first embodiment of the present invention.

For example, the IC chip 12 may be an IC chip for an IC tag storing ID information. Further, the IC chip 12 may be a module where an IC is mounted on a substrate and the like having terminals 12a and 12b. The IC chip 12 is mounted on the IC chip mounting portion 13 disposed at any location along a length of the antenna coil 14 on the top surface 11a of the film base 11. In the present embodiment, the IC chip mounting portion 13 has a pair of supporting portions 13a and 13b spaced from each other. The supporting portion 13a is connected to an inner end 14a of the antenna coil 14. The supporting portion 13b is connected to the first inner plate electrode 15. Further, the terminals 12a and 12b disposed at the periphery of the IC chip 12 are joined to the pair of supporting portions 13a and 13b by ultrasonic welding and the like. Consequently, the IC chip 12 is connected to the antenna coil 14 via the IC chip mounting portion 13. The IC chip 12 may be mounted on the IC chip mounting portion 13 using other methods (for example, thermocompression bonding, adhesion by conductive adhesive, laser beam welding and the like). The IC chip 12 performs wireless communication processing via the conducted antenna coil 14, and sends and receives predetermined signals to and from an external read/write device The antenna coil 14 is a planar spiral antenna and is electromagnetically coupled to an antenna of an external read/write device such as a reader/writer in order to perform wireless communication. The number of turns of the antenna coil 14 is, for example, about 2 to 6. FIG. 1A and FIG. 1B show an example with 4 turns, but the present invention is not limited to this. The width of each antenna wire constituting the antenna coil 14 is, for example, about 0.01 mm to 0.7 mm, more preferably about 0.02 mm to 0.6 mm. Further, the distance between the antenna wires constituting the antenna coil 14 is about 0.01 mm to 0.4 mm, more preferably about 0.02 mm to 0.3 mm. With this configuration, the antenna coil 14 sends and receives signals and receives power via wireless communication in a contactless manner.

The antenna coil 14 is formed from a conductor disposed on the top surface 11a of the film base 11. Specifically, the antenna coil 14 is formed into a rectangular pattern by etching a copper foil or an aluminum foil having a thickness of 5 μm to 50 μm laminated on the top surface 11a side of the film base 11 having insulating properties which is made of, for example, polyethylene terephthalate (PET) or polyethylene naphthalate (PEN) having a thickness of 15 μm to 50 μm. This antenna coil 14 is connected to the first outer plate electrode 16 at the outer end 14b. The antenna coil 14 is connected to the first inner plate electrode 15 at the inner end 14a via the IC chip mounting portion 13 and the IC chip 12.

A first inner plate electrode 15 is a planar electrode formed inside the antenna coil 14 on the top surface 11a of the film base 11. The first inner plate electrode 15 has a first electrode portion 15a extending along a long side direction (a first side direction) of the antenna coil 14, and a second electrode portion 15b extending along a short side direction (a second side direction) perpendicular to (intersecting) the long side direction of the antenna coil 14. The first electrode portion 15a and the second electrode portion 15b are each disposed adjacent to the inner periphery of the antenna coil 14 when viewed perpendicular to the film base 11.

Figure 12A:
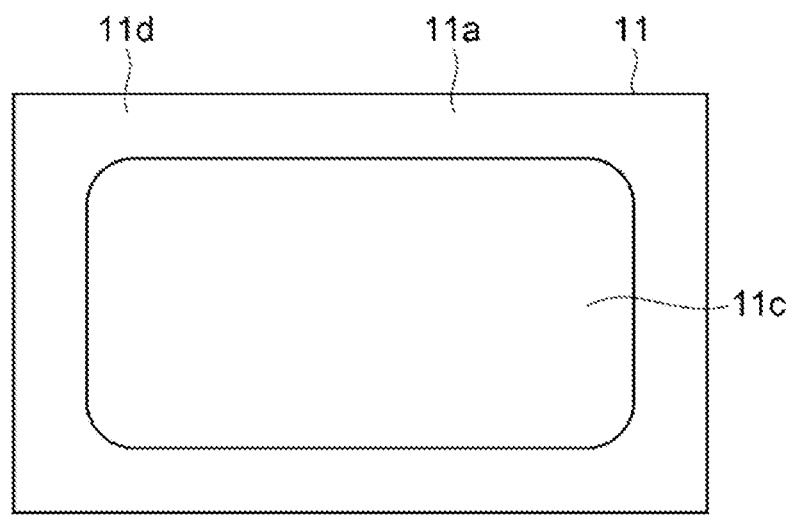
Figure 12B:
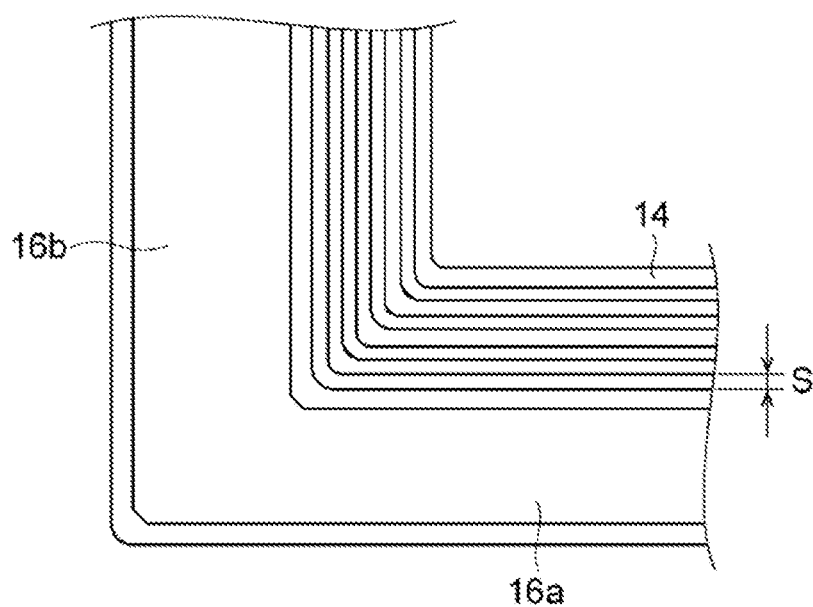
FIG. 12B is an enlarged partial plan view of the contactless communication medium.

A first outer plate electrode 16 is a planar electrode formed outside the antenna coil 14 on the top surface 11a of the film base 11. The first outer plate electrode 16 has a first electrode portion 16a extending along the long side direction of the antenna coil 14, and a second electrode portion 16b extending along the short side direction of the antenna coil 14, thus forming an L-shape as a whole. The first electrode portion 16a and the second electrode portion 16b are each disposed adjacent to the outer periphery of the antenna coil 14 when viewed perpendicular to the film base 11. It is preferred that the first electrode portion 16a and the second electrode portion 16b be disposed adjacent to the antenna coil 14 such that a spacing S defined by the outer periphery of the antenna coil 14 is 0.5 mm or less as shown in FIG. 12B. Similarly, it is preferred that other plate electrodes 15, 17, 18 and the like be disposed such that the spacing S defined by the inner periphery or the outer periphery of the antenna coil 14 is 0.5 mm or less. This close arrangement provides the required number of turns of the antenna coil 14 and realizes suitable arrangements of the plate electrodes 15 to 18 while providing the opening located at the center of the contactless communication medium 10.

As shown in FIG. 1A, the portion of the antenna coil 14 along which the first inner plate electrode 15 is disposed (i.e., in the example of FIG. 1A, the upper edge and the right edge of the antenna coil 14) is different from the portion of the antenna coil 14 along which the first outer plate electrode 16 is disposed (i.e., in the example of FIG. 1A, the left edge and the lower edge of the antenna coil 14). That is, the first inner plate electrode 15 and the first outer plate electrode 16 are disposed such that they do not share the same portions (edges) of the antenna coil 14. In other words, the first outer plate electrode 16 is disposed on the opposite side (i.e., point symmetrically) of the first inner plate electrode 15 with respect to a center point or a center line on the plane (surface 11a) of the film base 11. Such a symmetric arrangement also applies to the arrangement of a second inner electrode 17 and a second outer electrode 18 described later.

The distance between the first inner plate electrode 15 and the inner periphery of the antenna coil 14, and the distance between the first outer plate electrode 16 and the outer periphery of the antenna coil 14, are, for example, substantially the same as the separation width at the same circumferential position within the antenna coil 14, and as described above, it is, for example, preferably 0.5 mm or less. However, the distance mentioned above may be greater than the separation width within the antenna coil 14, or may be less than the separation width. Further, the first plate electrodes 15 and 16 are formed into a pattern by etching the metal foil laminated on the top surface 11a of the film base 11 similarly to the antenna coil 14. Second plate electrodes 17 and 18 and a jumper wire 19 described later are also similarly patterned by etching the metal foil laminated on the rear surface 11b of the film base 11.

The second inner plate electrode 17 is a planar electrode paired with the first inner plate electrode 15, and is disposed on the rear surface 11b of the film base 11 so that it is opposite to the first inner plate electrode 15 in the thickness direction of the film base 11. Similarly to the first inner plate electrode 15, the second inner plate electrode 17 has a first electrode portion 17a extending along the long side direction of the antenna coil 14, and a second electrode portion 17b extending along the short side direction of the antenna coil 14, thus forming an L-shape as a whole. As shown in FIG. 2A and FIG. 2B, the first and second electrode portions 17a and 17b are disposed opposite to the first and second electrode portions 15a and 15b of the first inner plate electrode 15 in the thickness direction of the film base 11. The first and second electrode portions 17a and 17b are disposed adjacent to the inner periphery of the antenna coil 14 when viewed perpendicular to the film base 11, similarly to the first and second electrode portions 15a and 15b of the first inner plate electrode 15.

The second outer plate electrode 18 is a planar electrode paired with the first outer plate electrode 16, and is disposed on the rear surface 11b of the film base 11 so that it is opposite to the first outer plate electrode 16 in the thickness direction of the film base 11. Similarly to the first outer plate electrode 16, the second outer plate electrode 18 has a first electrode portion 18a extending along the long side direction of the antenna coil 14, and a second electrode portion 18b extending along the short side direction of the antenna coil 14, to form an L-shape as a whole. As shown in FIG. 2A and FIG. 2B, the first and second electrode portions 18a and 18b are disposed opposite to the first and second electrode portions 16a and 16b of the first outer plate electrode 16 in the thickness direction of the film base 11. Therefore, the first and second electrode portions 18a and 18b are each disposed adjacent to the outer periphery of the antenna coil 14 when viewed perpendicular to the film base 11, similarly to the first and second electrode portions 16a and 16b of the first outer plate electrode 16.

As described above, with the first plate electrodes 15 and 16 and the second plate electrodes 17 and 18 disposed opposite to each other, the first plate electrodes 15 and 16 and the second plate electrodes 17 and 18 each form a capacitance portion (see FIG. 3). As shown in FIG. 2A and FIG. 2B, in the present embodiment, the first plate electrodes 15 and 16 and the second plate electrodes 17 and 18 are disposed on the film base 11 such that the first plate electrodes 15 and 16 entirely cover the second plate electrodes 17 and 18 when viewed perpendicular to the film base 11. With this arrangement of the plate electrodes, even if the second plate electrodes 17 and 18 are slightly misaligned from the first plate electrodes 15 and 16 due to manufacturing tolerances and the like, electrostatic capacitance of the parallel plates formed by both electrodes will not change, which reduces variations in electric characteristics of products.

The jumper wire 19 is a wire that connects the second inner plate electrode 17 to the second outer plate electrode 18 on the rear surface 11b of the film base 11. The jumper wire 19 connects a tip portion of the second electrode portion 17b of the second inner plate electrode 17 to a side portion at the tip portion side of the first electrode portion 18a of the second outer plate electrode 18. It is preferred that the electrostatic capacitance between the jumper wire 19 and a portion of the antenna coil 14 opposite to the jumper wire 18 is low, and therefore it is preferred that the width is as small as possible (for example, about 1 to 3 mm). Further, the jumper wire 19, disposed opposite to a portion of the antenna coil 14 in the thickness direction of the film base 11, is preferably formed perpendicular to the antenna coil 14. This further reduces the electrostatic capacitance generated. As used herein, the term "perpendicular" does not only include the case where the antenna coil 14 and the jumper wire 19 intersect each other at right angles when viewed perpendicular to the film base 11 (or when viewed through the antenna forming surface of the film base 11), but also includes the case where they intersect each other at 90° plus or minus 10° (from 80° to 100°), which is a range permissible from a design perspective of. Further, "disposed perpendicular to" mentioned above means that the antenna coil 14 and the jumper wire 19 are "perpendicular to each other" at least at a portion where they are intersecting each other, but it is not necessarily required that the entire jumper wire 19 be "perpendicular" to the antenna coil 14. Further, with the perpendicular arrangement, the jumper wire 19 connects the second plate electrodes 17 and 18 so that the distance therebetween is the shortest. This in turn reduces resistance losses of the jumper wire 19. Such a jumper wire 19 allows an electrical connection between the second inner plate electrode 17 and the second outer plate electrode 18.

The contactless communication medium 10 having such a configuration can be expressed as an equivalent circuit shown in FIG. 3. As shown in FIG. 3, the contactless communication medium 10 constitutes a circuit having the IC chip 12, the antenna coil 14, the first capacitance portion 16 and 18, the jumper wire 19, and the second capacitance portion 15 and 17 connected in series in that order.

The pair of inner plate electrodes 15 and 17 consisting of the first inner plate electrode 15 and the second inner plate electrode 17 (namely, the pair of plate electrodes forming the second capacitance portion 15 and 17), and the pair of the outer plate electrodes 16 and 18 consisting of the first outer plate electrode 16 and the second outer plate electrode 18 (namely, the pair of plate electrodes forming the first capacitance portion 16 and 18) are arranged such that an electric current flows in the same direction as an electric current passing through the antenna coil 14. Such an arrangement is realized by providing the jumper wire 19 such that the electric current passing through the pair of outer plate electrodes 16 and 18, the jumper wire 19, and the pair of inner plate electrodes 15 and 17 flows in the same direction as the electric current passing through the antenna coil 14 when viewed perpendicular to the film base 11 (for example, clockwise or counterclockwise when viewed in the top surface 11a side of the film base 11).

The flow of an electric current passing through the antenna coil 14 at a given instant will now be described by providing an example case where the electric current passing through the antenna coil 14 flows from its outer end 14b toward its inner end 14a. As shown in FIG. 1A the electric current passing through the antenna coil 14 flows from its outer end 14b in a clockwise direction, circles along the antenna coil 14 in a rectangular shape several times, (for example, 4 times in the present embodiment), and flows into the electrode portion 15a of the first inner plate electrode 15 via the inner end 14a, the IC chip mounting portion 13, and the IC chip 12. Further, the electric current having flowed into the electrode portion 15a returns to the outer end 14b of the antenna coil 14 via the pair of inner plate electrodes 15 and 17, the jumper wire 19, and the pair of outer plate electrodes 16 and 18. The direction of the electric current flowing in that order is a clockwise direction as shown in the figure of FIG. 1A, and therefore conforms to the direction of the electric current passing through the antenna coil 14.

As described above, in the contactless communication medium 10 of the present embodiment, capacitance portions capable of propagating high-frequency signals are formed by the first plate electrodes 15 and 16, and the second plate electrodes 17 and 18, which are respectively disposed on the surfaces 11a and 11b of the film base 11 so that they are opposite to each other. Further, the first plate electrodes 15 and 16, and the second plate electrodes 17 and 18 have the first electrode portions 15a, 16a, 17a, and 18a extending along the long side direction of the antenna coil 14, and the second electrode portions 15b, 16b, 17b, and 18b extending along the short side direction of the antenna coil 14 so that they are adjacent to the inner periphery or the outer periphery of the antenna coil 14 formed in a rectangular spiral shape when viewed perpendicular to the film base 11. This arrangement of the plate electrodes enables the contactless communication medium to have parallel plate electrodes and an opening of the antenna coil 14 (a region having no wiring pattern) under the constraints imposed by the limited outer dimensions of the contactless communication medium. More specifically, for example, as shown in FIG. 12A, an opening 11c having no antenna coil 14 (an antenna non-arranging region) is disposed in a central portion of the top surface 11a of the film base 11, and on the periphery, an antenna arranging region 11d, where the antenna coil 14 is to be arranged, is defined. In the contactless communication medium 10 of the present embodiment, the antenna coil 14 and the first plate electrodes 15 and 16 (the second plate electrodes 17 and 18) are disposed in the antenna arranging region 11d, and the region of the opening 11c covers about more than half of the entire area of the top surface 11a, which provides a sufficiently large opening. In the contactless communication medium 10, the IC chip mounting portion 13 and the IC chip 12 may be disposed in the opening 11c; however, unlike the antenna coil 14, these members are unlikely to pose problems when disposed in this position.

Further, in the contactless communication medium 10 of the present embodiment, the pair of inner plate electrodes 15 and 17, and the pair of outer plate electrodes 16 and 18 are arranged such that, when viewed perpendicular to the film base 11, the portion (edge) of the antenna coil 14 along which the pair of the inner plate electrodes 15 and 17 are disposed is different from the portion (edge) of the antenna coil 14 along which the pair of the outer plate electrodes 16 and 18 are disposed. In this case, the pair of inner plate electrodes 15 and 17 inside the antenna coil 14 and the pair of outer plate electrodes 16 and 18 outside the antenna coil 14 are arranged such that they do not share the same portions of the antenna coil 14. That is, the pair of inner plate electrodes 15 and 17 and the pair of outer plate electrodes 16 and 18 are arranged such that they are not adjacent to each other and do not sandwich the same portion of the antenna coil 14 therebetween. With this arrangement, the antenna coil 14, the pair of inner plate electrodes 15 and 17, and the pair of outer plate electrodes 16 and 18 are disposed on the film base 11 in a balanced manner. Specifically, the antenna coil 14, and the plate electrodes 15, 16, 17, and 18 are appropriately arranged in an equally spaced and annular antenna pattern arrangement area as set according to a standard (for example, ISO/IEC 14443-1, Class 1) and the like.

In the contactless communication medium 10 of the present embodiment, the pair of inner plate electrodes 15 and 17, and the pair of outer plate electrodes 16 and 18 are arranged so that an electric current flows in the same direction as an electric current passing through the antenna coil 14 as described above. The number of coil turns can be effectively increased by enabling the pair of inner plate electrodes 15 and 17, and the pair of outer plate electrodes 16 and 18 to function as a radiating element that passes an electric current in the same direction as an electric current passing through the antenna coil 14. In the example of FIG. 1A and FIG. 1B, the number of turns of the antenna coil 14 is 4. However, the effective number of coil turns has been increased by 1 due to the plate electrodes 15, 16, 17, and 18, and the jumper wire 19, and thus, the antenna coil 14 has an antenna function equivalent to that of the antenna coil 14 with 5 turns. Consequently, the number of turns (i.e., a region of an antenna pattern) required of the antenna coil 14 is reduced due to the effectively increased number of coil turns, thus increasing the area of the opening of the antenna coil 14.

Further, in the present embodiment, both the pair of inner plate electrodes 15 and 17, and the pair of outer plate electrodes 16 and 18 are disposed along two sides of the rectangular antenna coil 14. However, for example, the pair of inner plate electrodes may be disposed along one side of the antenna coil 14 and the pair of outer plate electrodes may be disposed along the remaining three sides in a U-shape. Conversely, the pair of outer plate electrodes may be disposed along one side of the antenna coil 14 and the pair of inner plate electrodes may be disposed along the remaining three sides of the antenna coil 14. These arrangements also produces the effects mentioned above.

Second Embodiment

Figure 4A:
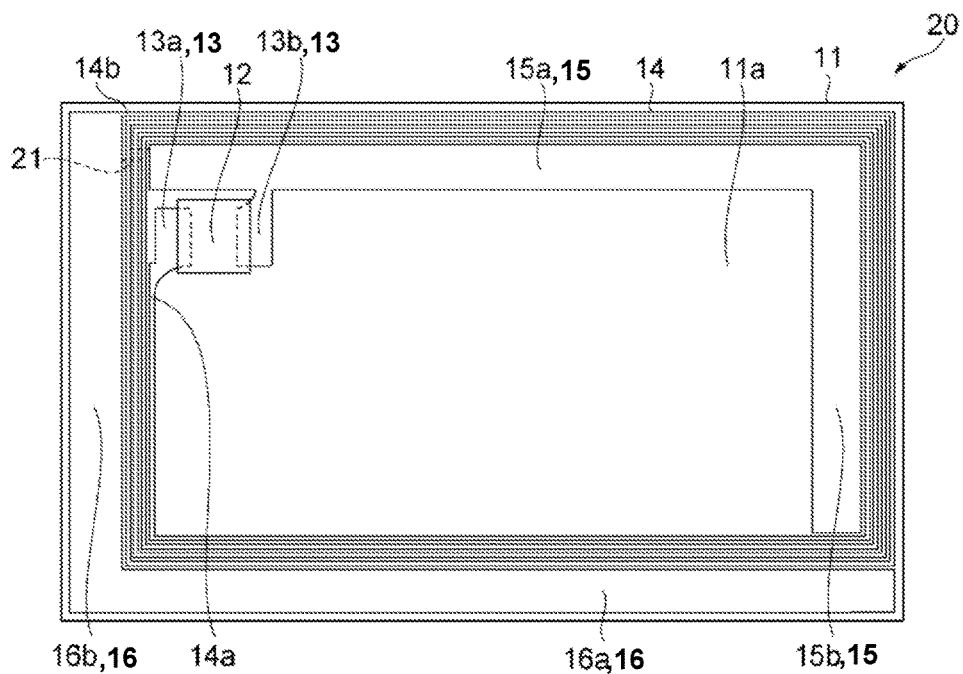
Figure 4B:
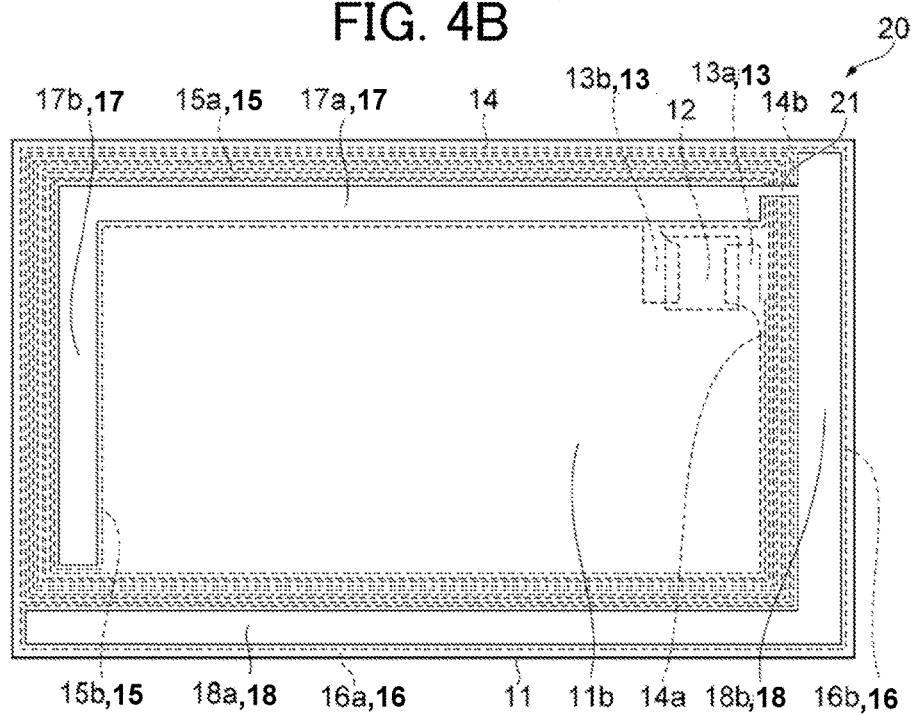
FIG. 4B is a rear view thereof, according to a second embodiment of the present invention.

With reference to FIG. 4A and FIG. 4B, a contactless communication medium of a second embodiment of the present invention will now be described. FIG. 4A is a top view of a contactless communication medium, showing its internal structure, according to the second embodiment of the present invention, while FIG. 4B is a rear view thereof. FIG. 4B is a rear view thereof, where the top view shown in FIG. 4A is reversed about its central longitudinal axis. A contactless communication medium 20 of the present embodiment differs from the contactless communication medium 10 of the first embodiment in that a jumper wire 21, connecting the second inner plate electrode 17 to the second outer plate electrode 18, connects a tip portion of the first electrode portion 17a of the second inner plate electrode 17 to a side portion near a tip portion of the second electrode portion 18b of the second outer plate electrode 18. Thus, in the contactless communication medium 20, the pair of inner plate electrodes 15 and 17, and the pair of outer plate electrodes 16 and 18 do not pass an electric current in the same direction as an electric current passing through the antenna coil 14.

The flow of an electric current passing through the antenna coil 14 of the contactless communication medium 20 at a given instant will be described by providing an example case where the electric current passing through the antenna coil 14 flows from its outer end 14b toward its inner end 14a. As shown in FIG. 1A, the electric current passing through the antenna coil 14 flows from its outer end 14b in a clockwise direction, circles around several times (for example, 4 times in the present embodiment) along the antenna coil 14 in a rectangular shape, and flows into the electrode portion 15a of the first inner plate electrode 15 via the inner end 14a, the IC chip mounting portion 13, and the IC chip 12. The electric current flowing into the electrode portion 15a returns to the outer end 14b of the antenna coil 14 via the pair of inner plate electrodes 15 and 17, the jumper wire 19, and the pair of outer plate electrodes 16 and 18. The direction of the electric current flowing in this order is a counterclockwise direction as shown in FIG. 4A, and therefore does not conform to the direction of the electric current passing through the antenna coil 14.

Thus, in the contactless communication medium 20 of the second embodiment, the pair of inner plate electrodes 15 and 17 and the pair of outer plate electrodes 16 and 18 do not function as radiating elements, but as capacitance portions. The contactless communication medium 20 has a structure similar to the contactless communication medium 10 of the first embodiment regarding points other than the above, and therefore produces effects similar to those of the contactless communication medium 10.

Third Embodiment

Figure 5A:
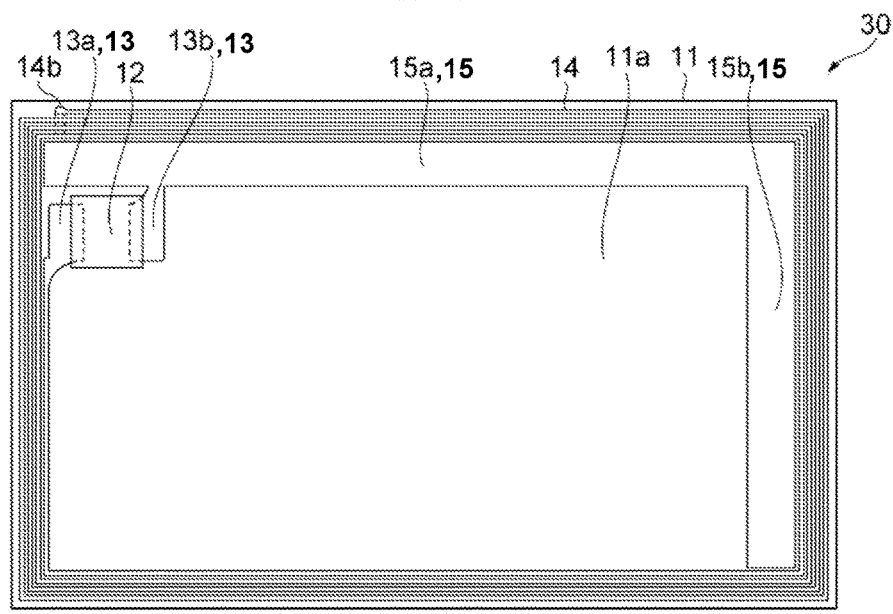
Figure 5B:
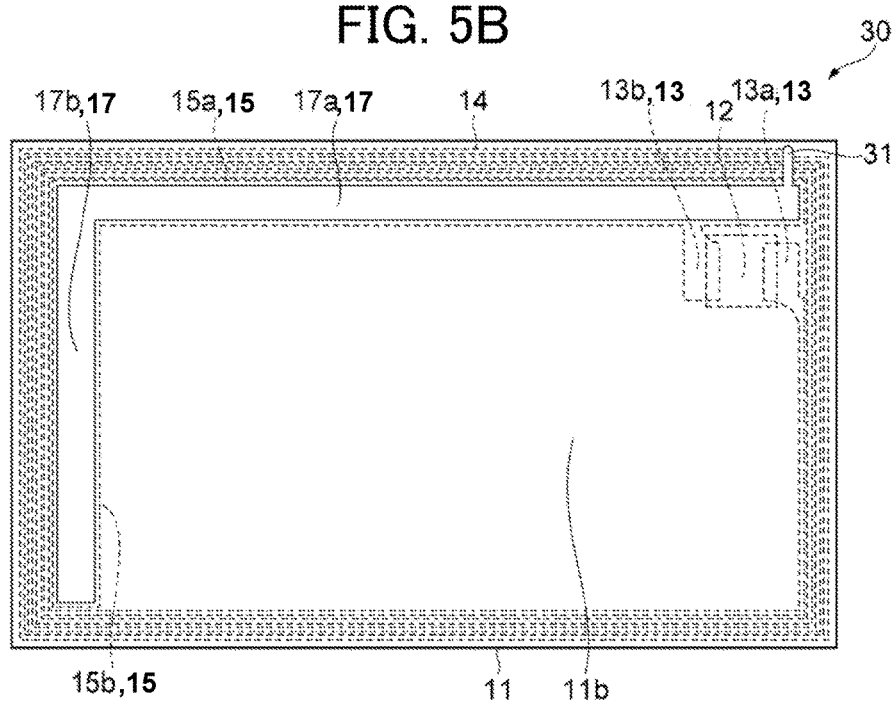
FIG. 5B is a rear view thereof, according to a third embodiment of the present invention.

With reference to FIGS. 5A and 5B, a contactless communication medium of a third embodiment of the present invention will now be described. FIG. 5A is a top view of a contactless communication medium, showing its internal structure, according to the third embodiment of the present invention, while FIG. 5B is a rear view thereof. FIG. 5B is a rear view thereof, where the top view shown in FIG. 5A is reversed about its central longitudinal axis. A contactless communication medium 30 of the present embodiment differs from the contactless communication medium 10 of the first embodiment in that, instead of not having the pair of outer plate electrodes 16 and 18, and the jumper wire 19, it has a conduction portion 31 for electrically connecting the outer end 14b of the antenna coil 14 and the second inner plate electrode 17.

The conduction portion 31 is a wire extending from the tip portion of the first electrode portion 17a of the second inner plate electrode 17 to the position overlapping the outer end 14b of the antenna coil 14 in the thickness direction of the film base 11. The tip of the conduction portion 31 and the outer end 14b are connected to each other by caulking, welding and the like via a through hole disposed in the film base 11. With the outer end 14b of the antenna coil 14 connected to the second inner plate electrode 17 via the conduction portion 31, the contactless communication medium 30 constitutes an equivalent circuit of a structure where the first capacitance portion 16 and 18, and the jumper wire 19 are replaced by the conduction portion 31 in the equivalent circuit shown in FIG. 3.

In the contactless communication medium 30 of the present embodiment, a capacitance portion capable of propagating high-frequency signals is formed of the first inner plate electrode 15 and the second inner plate electrode 17 respectively disposed on surfaces 11a and 11b of the film base 11 so as to be opposite to each other. Further, the first inner plate electrode 15 and the second inner plate electrode 17 respectively have the first electrode portions 15a and 17a extending along the long side direction of the antenna coil 14, and the second electrode portions 16b and 18b extending along the short side direction of the antenna coil 14 so as to be adjacent to the inner periphery of the antenna coil 14 formed in a rectangular spiral shape when viewed perpendicular to the film base 11. This arrangement of the plate electrodes enables the contactless communication medium to have parallel plate electrodes and an opening of the antenna coil 14 under the constraints imposed by the limited outer dimensions of the contactless communication medium.

In the present embodiment, the pair of outer plate electrodes 16 and 18, which are formed outside the antenna coil 14, are omitted among the plate electrodes constituting the contactless communication medium 10 of the first embodiment. Alternatively, the pair of inner plate electrodes 15 and 17 may be omitted instead of the pair of outer plate electrodes 16 and 18. In that case, for example, the IC chip mounting portion 13 is disposed anywhere between the inner end 14*a* and the outer end 14*b* of the antenna coil 14, and a conduction portion is provided for electrically connecting the inner end 14*a* of the antenna coil 14 and the second outer plate electrode 18. Such a configuration enables the contactless communication medium to have parallel plate electrodes and an opening of the antenna coil 14 under the constraints imposed by the limited outer dimensions of the contactless communication medium, similarly to the above-described contactless communication medium 30.

Fourth Embodiment

Figure 6A:
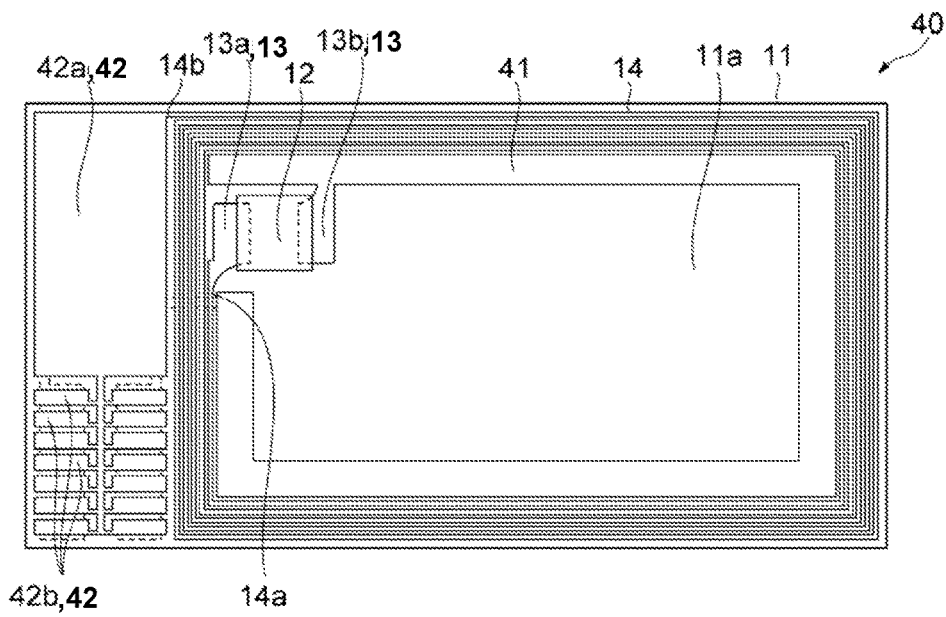
Figure 6B:
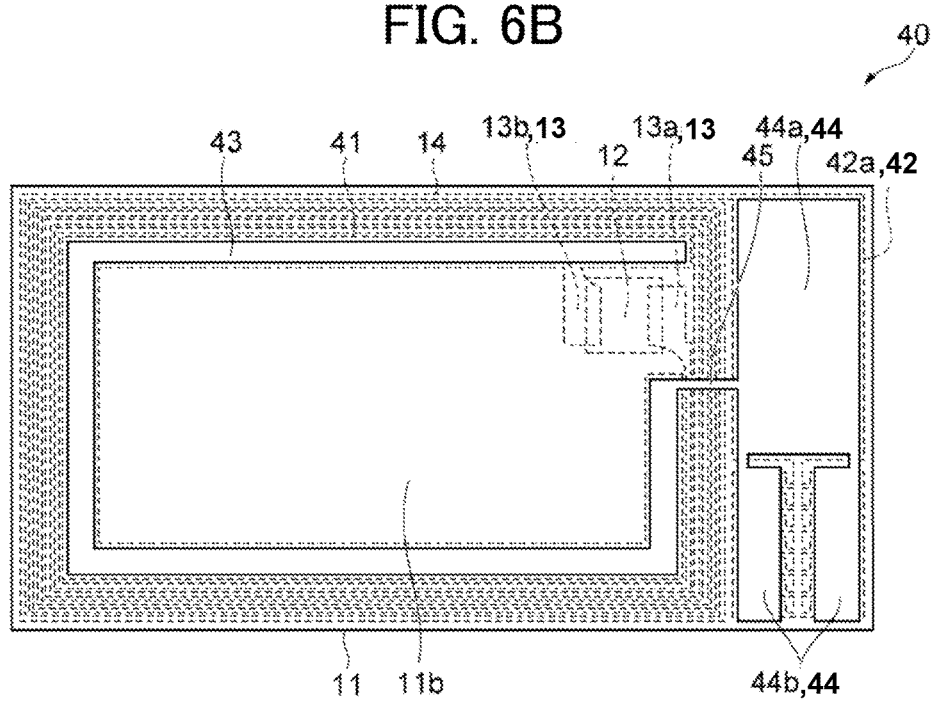
FIG. 6B is a rear view thereof, according to a fourth embodiment of the present invention.

With reference to FIG. 6A and FIG. 6B, a contactless communication medium of a fourth embodiment of the present invention will now be described. FIG. 6A is a top view of a contactless communication medium, showing its inner structure, according to the fourth embodiment of the present invention, while FIG. 6B is a rear view thereof. Further, FIG. 6B is a rear view thereof, where the top view shown in FIG. 6A is reversed about its central longitudinal axis. Regarding a contactless communication medium 40 of the present embodiment, a configuration that is primarily different from that of the contactless communication medium 10 of the first embodiment is hereinafter described.

The contactless communication medium 40 has a first inner plate electrode 41 and a first outer plate electrode 42 formed inside and outside the rectangular antenna coil 14 on the top surface 11*a* of the film base 11. The first inner plate electrode 41 is disposed along the four sides of the antenna coil 14 so as to be adjacent to the inner periphery of the antenna coil 14. That is, the first inner plate electrode 41 is formed such that portions along each of the four sides of the antenna coil 14 are coupled to one another, and almost make a circle around the inner periphery of the antenna coil 14. Thus, the first inner plate electrode 41 has an electrode portion extending along each of the long side direction and the short side direction of the antenna coil 14 when viewed perpendicular to the film base 11. The first outer plate electrode 42 is disposed along the short side portion of the antenna coil 14 outside the antenna coil 14. The first outer plate electrode 42 consists of a rectangular first portion 42*a* covering more than half of the entire area, and 14 rectangular second portions 42*b* connected to a wiring pattern branched off from the central portion of the short side portion of the first portion 42*a*. The second portion 42*b* is smaller than the first portion 42*a*, and the portions are arranged in 2 rows, 7 pieces each.

Further, the contactless communication medium 40 has a second inner plate electrode 43 and a second outer plate electrode 44 formed on the inside and the outside of a rectangular shaped region (i.e., a region showing the antenna coil 14 by dashed lines in FIG. 6B corresponding to the antenna coil 14 on the rear surface 11*b* of the film base 11. The second inner plate electrode 43 is formed so as to be opposite to the first inner plate electrode 41 in the thickness direction of the film base 11. The second inner plate electrode 43 is arranged along the 4 sides of the rectangular shaped region so as to be adjacent to the inner periphery of the rectangular shaped region corresponding to the antenna coil 14, similarly to the first inner plate electrode 41. Namely, the second inner plate electrode 43 has an electrode portion extending along each of the long side direction and the short side direction of the antenna coil 14 when viewed perpendicular to the film base 11. On the other hand, the second outer plate electrode 44 is formed so as to be opposite to the first outer plate electrode 42 in the thickness direction of the film base 11. The second outer plate electrode 44 consists of a rectangular shaped first portion 44*a* covering half or more of the entire area, and 2 rectangular shaped second portions 44*b* connected to wiring patterns extending from both edges of a short side portion of the first portion 44*a*. The first portion 44*a* is arranged so as to be opposite to the first portion 42*a* of the first outer plate electrode 42 in the thickness direction of the film base 11. The second portion 44*b* is arranged so as to be opposite to 1 column (i.e., 7 pieces) of the second portions 42*b* of the first outer plate electrode 42 in the thickness direction of the film base 11. On the rear surface 11*b* of the film base 11, a terminal of the second inner plate electrode 43 and the first portion 44*a* of the second outer plate electrode 44 are connected with a jumper wire 45.

A flow of an electric current passing through the antenna coil 14 of the contactless communication medium 40 at a given instant is hereinafter described by providing an example of the case where the electric current passing through the antenna coil 14 flows from its outer end 14*b* toward its inner end 14*a*. As shown in FIG. 6A, the electric current passing through the antenna coil 14 flows from its outer end 14*b* in a clockwise direction as shown in the figure, circles around the antenna coil 14 in a rectangular shape several times, (for example, 5 times in the present embodiment), and flows into the first inner plate electrode 41 via the inner end 14*a*, the IC chip mounting portion 13, and the IC chip 12. Further, the electric current flowing into the first inner plate electrode 41 returns to the outer end 14*b* of the antenna coil 14 via the pair of the inner plate electrodes 41 and 43 consisting of the first inner plate electrode 41 and the second inner plate electrode 43, the jumper wire 45, and the pair of outer plate electrodes 42 and 44 consisting of the first outer plate electrode 42 and the second outer plate electrode 44. As described above, the pair of inner plate electrodes 41 and 43 are formed in a shape almost making a circle clockwise as shown in FIG. 6A in the inner circumference side of the antenna coil 14 along the 4 sides of the antenna coil 14 when viewed perpendicular to the film base 11. Therefore, the direction of the electric current passing through the pair of inner plate electrodes 41 and 43 conforms to the direction of the electric current passing through the antenna coil 14.

As such, in the contactless communication medium 40, the pair of inner plate electrodes 41 and 43 are arranged so as to pass the electric current along the same direction as the direction of the electric current passing through the antenna coil 14. The effective number of coil turns can be increased by having the pair of inner plate electrodes 41 and 43 function as a radiating element that passes the electric current in the same direction as the direction of the electric current passing through the antenna coil 14. Thus, it is possible to reduce the number of turns required of the antenna coil 14 due to the effectively increased number of coil turns, and the area of the opening of the antenna coil 14 can be increased. Further, in this example, the pair of outer plate electrodes 42 and 44 do not function as a radiating element, but purely function as a capacitance portion.

Further, as shown in FIG. 6A and FIG. 6B, in the contactless communication medium 40, the first inner plate electrode 41 and the second inner plate electrode 43 are arranged on the film base 11 such that the first inner plate electrode 41 entirely covers the second inner plate electrode 43 when viewed perpendicular to the film base 11. Further, the first electrode portion 42a of the first outer plate electrode 42, and the first electrode portion 44a of the second outer plate electrode 44 are arranged on the film base 11 such that the first electrode portion 42a entirely covers the first electrode portion 44a when viewed perpendicular to the film base 11. Further, the second electrode portion 42b of the first outer plate electrode 42, and the second electrode portion 44b of the corresponding second outer plate electrode 44 are arranged on the film base 11 such that the second electrode portion 42b entirely covers the second electrode portion 44b in the longitudinal direction of the film base 11 (a first direction parallel to the surface of the film base), and the second electrode portion 44b entirely covers the second electrode portion 42b in the transverse direction of the film base 11 (a second direction parallel to the surface of the film base and perpendicular to the first direction), when viewed perpendicular to the film base 11. By arranging the plate electrodes as such, even when a slight misalignment in formation positions of the second plate electrodes 43 and 44 develops relative to formation positions of the first plate electrodes 41 and 42 due to manufacturing tolerance and the like, electrostatic capacitance of the parallel plates formed by the electrodes will not change, and an effect of reducing variance in electric properties of products can be expected.

Further, in the contactless communication medium 40, the first inner plate electrode 41 and the second inner plate electrode 43 are arranged so as to be adjacent to the antenna coil 14 along the 4 sides of the antenna coil 14 when viewed perpendicular to the film base 11. This arrangement of the plate electrodes enables the contactless communication medium to have parallel plate electrodes and an opening of the antenna coil 14 under the constraints imposed by the limited outer dimensions of the contactless communication medium.

Fifth Embodiment

Figure 7A:
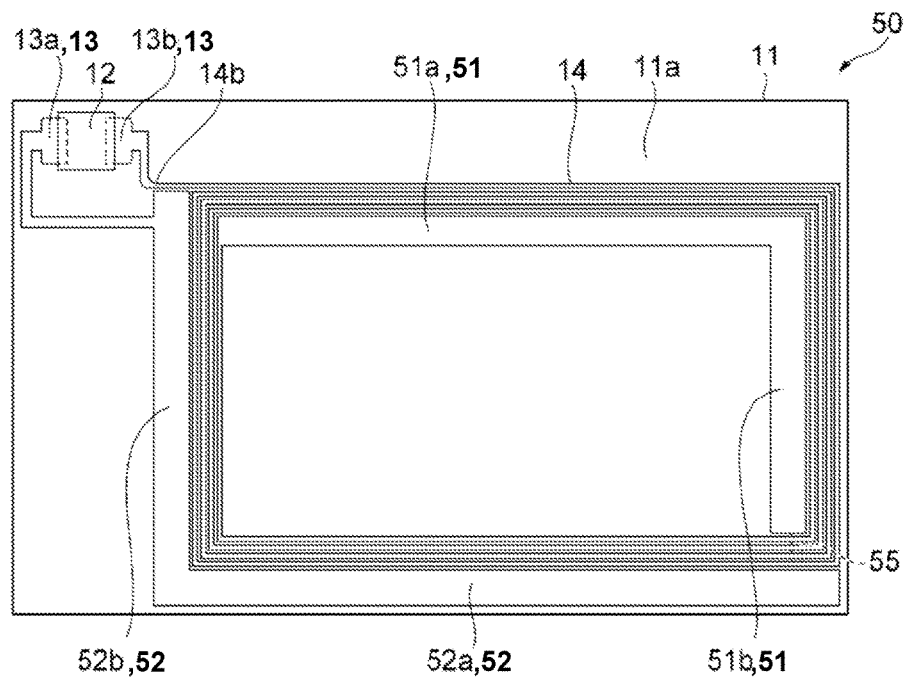
Figure 7B:
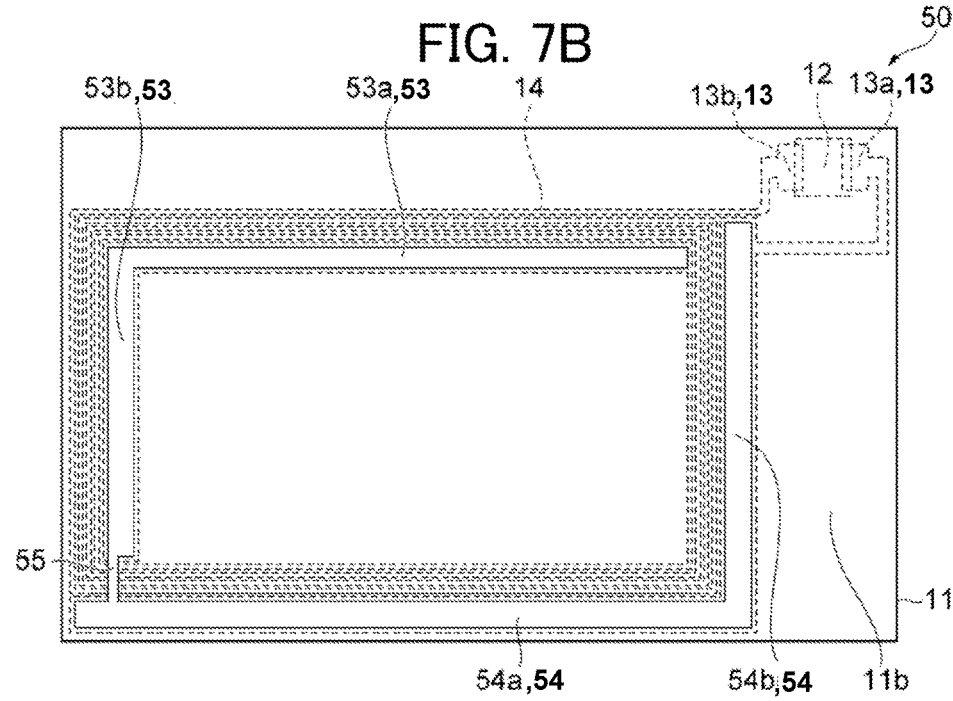
FIG. 7B is a rear view thereof, according to a fifth embodiment of the present invention.

Next, a contactless communication medium of a fifth embodiment of the present invention will be described with reference to FIG. 7A and FIG. 7B. FIG. 7A is a top view showing an internal structure of a contactless communication medium of the fifth embodiment of the present invention, and FIG. 7B is a rear view thereof. Further, FIG. 7B shows a rear side view thereof, where the top view shown in FIG. 7A is reversed about its central longitudinal axis. A contactless communication medium 50 of the present embodiment is primarily different from the contactless communication medium 10 of the first embodiment in that the IC chip mounting portion 13 is arranged on the outside of the antenna coil 14 when viewed perpendicular to the film base 11, but is similar to the structure of the contactless communication medium 10 of the first embodiment regarding other aspects. Namely, although there are a few differences in size and position, the contactless communication medium 50 has first plate electrodes 51 and 52, and second plate electrodes 53 and 54 which is a structure similar to the first plate electrodes 15 and 16, and the second plate electrodes 17 and 18 in the contactless communication medium 10. Further, the contactless communication medium 50 has a jumper wire 55 connecting a second inner plate electrode 53 and a second outer plate electrode 54, similarly to the jumper wire 19 in the contactless communication medium 10.

In the contactless communication medium 50, the IC chip mounting portion 13 is arranged along a corner of the top surface 11a of the film base 11. On the other hand, the antenna coil 14 and the first plate electrodes 51 and 52 are arranged along a corner facing, in a diagonal direction, a corner where the IC chip mounting portion 13 is arranged on the top surface 11a of the film base 11. In an example of FIG. 7A and FIG. 7B, one supporting portion 13a of the IC chip mounting portion 13 is connected to a second electrode portion 52b of the first outer plate electrode 52 via a predetermined wiring pattern. Further, the other supporting portion 13b of the IC chip mounting portion 13 is connected to the outer end 14b of the antenna coil 14.

According to the contactless communication medium 50 of the fifth embodiment, it is possible to obtain effects similar to those produced by the contactless communication medium 10 of the first embodiment described above, and concurrently the area of the opening of the antenna coil 14 can be increased by arranging relatively large parts such as the IC chip mounting portion 13 and the IC chip 12 mounted on the IC chip mounting portion 13 not in the inside, but on the outside of the antenna coil 14.

Sixth Embodiment

Figure 8A:
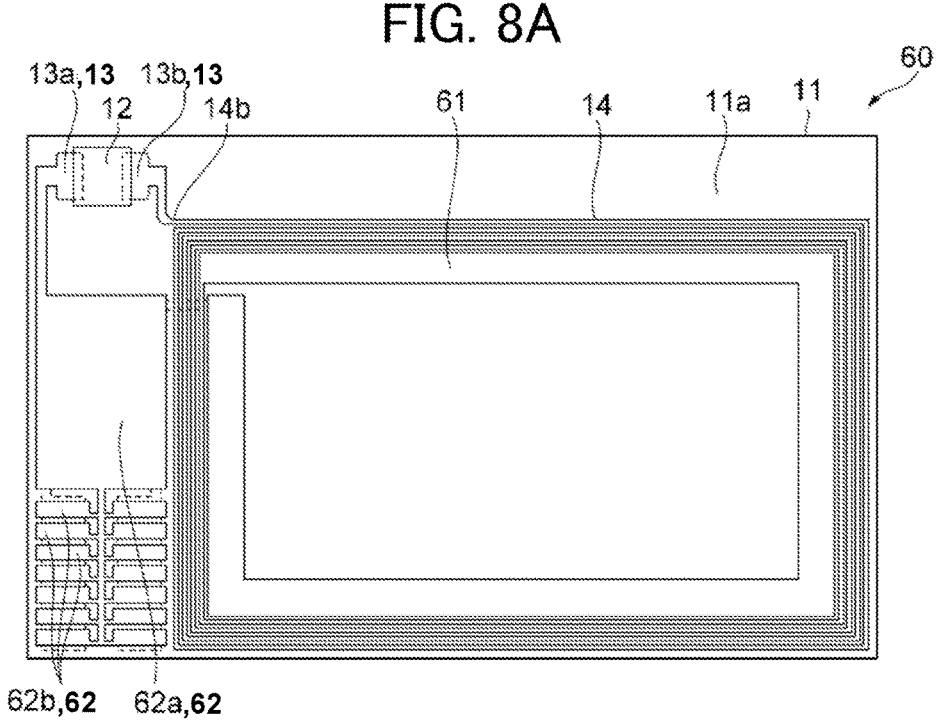
Figure 8B:
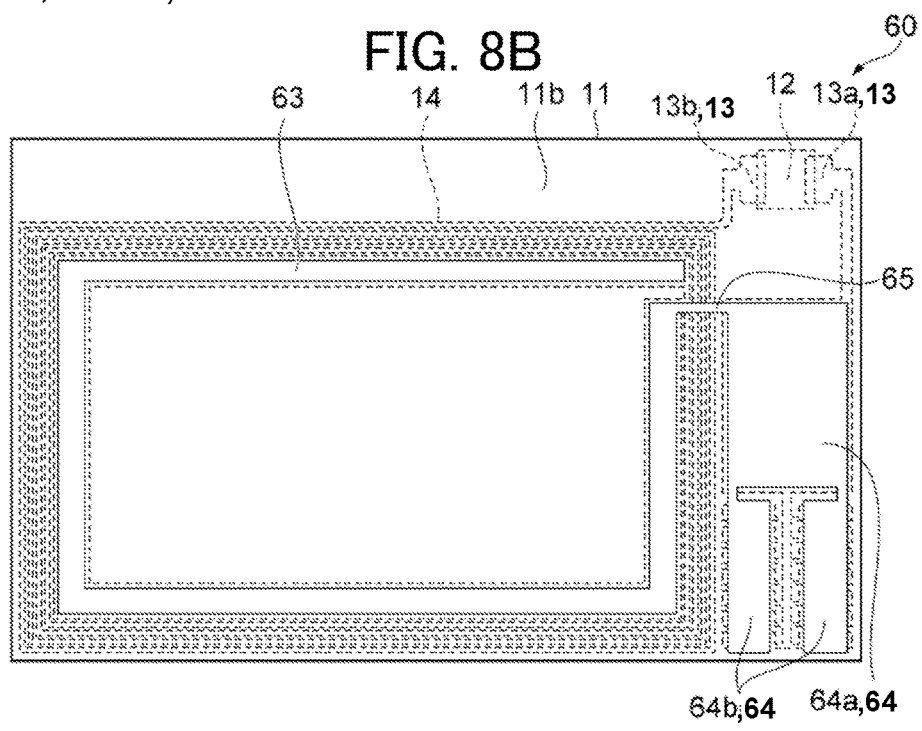
FIG. 8B is a rear view thereof, according to a sixth embodiment of the present invention.

Next, a contactless communication medium of a sixth embodiment of the present invention will be described with reference to FIG. 8A and FIG. 8B. FIG. 8A is a top view showing an internal structure of a contactless communication medium of the sixth embodiment of the present invention, and FIG. 8B is a rear view thereof. Further, FIG. 8B shows a rear side view thereof, where the top view shown in FIG. 8A is reversed about its central longitudinal axis. A contactless communication medium 60 of the present embodiment is primarily different from the contactless communication medium 40 of the fourth embodiment in that the IC chip mounting portion 13 is arranged on the outside of the antenna coil 14 when viewed perpendicular to the film base 11, but is similar to the structure of the contactless communication medium 40 of the fourth embodiment regarding other details. Namely, although there are a few differences in size and position, the contactless communication medium 60 has first plate electrodes 61 and 62, and second plate electrodes 63 and 64 which is a structure similar to the first plate electrodes 41 and 42, and the second plate electrodes 43 and 44 in the contactless communication medium 40. Further, the contactless communication medium 60 has a jumper wire 65 connecting a second inner plate electrode 63 and a second outer plate electrode 64, similarly to the jumper wire 45 in the contactless communication medium 40.

In the contactless communication medium 60, the IC chip mounting portion 13 is arranged along a corner of the top surface 11a of the film base 11, similarly to the contactless communication medium 50 of the fifth embodiment. On the other hand, the antenna coil 14 and the first inner plate electrode 61 are arranged along a corner facing, in a diagonal direction, a corner where the IC chip mounting portion 13 is arranged on the top surface 11a of the film base 11. In the example of FIG. 8A and FIG. 8B, one supporting portion 13a of the IC chip mounting portion 13 is connected to a first electrode portion 62b of the first outer plate electrode 62 via a predetermined wiring pattern. Further, the other supporting portion 13b of the IC chip mounting portion 13 is connected to the outer end 14b of the antenna coil 14.

According to the contactless communication medium 60 of the sixth embodiment, it is possible to obtain effects similar to those produced by the contactless communication medium 40 of the fourth embodiment described above, and concurrently the area of the opening of the antenna coil 14 can be increased by arranging relatively large parts such as the IC chip mounting portion 13 and the IC chip 12 mounted on the IC chip mounting portion 13 not in the inside, but on the outside of the antenna coil 14.

Further, in the contactless communication medium 60, the pair of outer plate electrodes 62 and 64 consisting of the first outer plate electrode 62 and the second outer plate electrode 64 are arranged along the outer periphery and the IC chip mounting portion 13 in the short side portion of the antenna coil 14 when viewed perpendicular to the film base 11. A space on the film base 11 where the first outer plate electrode 62 and the second outer plate electrode 64 are arranged is a space necessarily formed when the IC chip mounting portion 13 is arranged on the outside of the antenna coil 14. By arranging the first outer plate electrode 62 and the second outer plate electrode 64 on the space necessarily formed as such, plate electrodes can be arranged by effectively using an empty space on the outside of the antenna coil 14 on the film base 11. Thereby, the area of plate electrodes functioning as a capacitance portion can be increased, and performance as a capacitance portion can be stabilized.

Seventh Embodiment

Figure 9A:
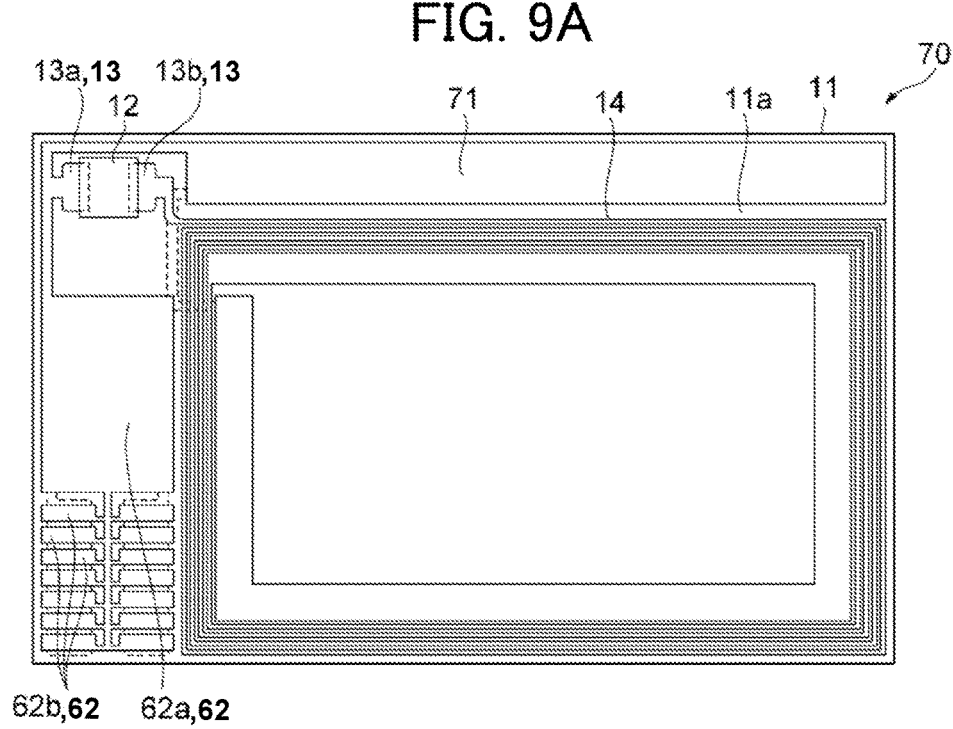
Figure 9B:
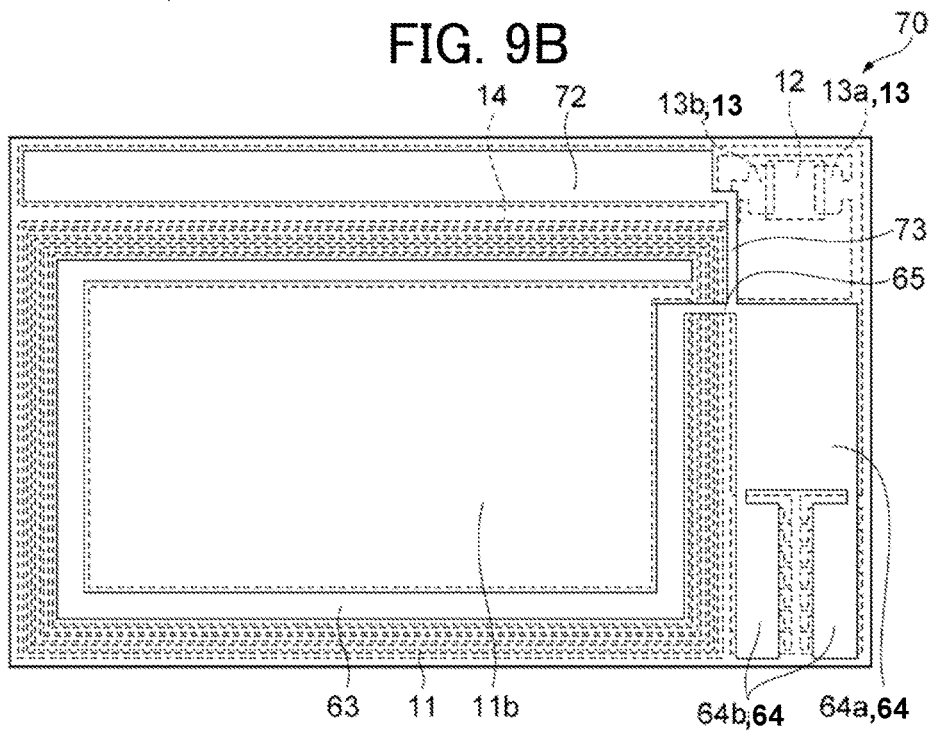
FIG. 9B is a rear view thereof, according to a seventh embodiment of the present invention.

Next, a contactless communication medium of a seventh embodiment of the present invention will be described with reference to FIG. 9A and FIG. 9B. FIG. 9A is a top view showing an internal structure of a contactless communication medium of the seventh embodiment of the present invention, and FIG. 9B is a rear view thereof. Further, FIG. 9B shows a rear side view thereof, where the top view shown in FIG. 9A is reversed about its central longitudinal axis. A contactless communication medium 70 of the present embodiment is different from the contactless communication medium 60 of the sixth embodiment in that it further has a first outer plate electrode 71, a second outer plate electrode 72, and a jumper wire 73, but is similar to the contactless communication medium 60 regarding other details. The first outer plate electrode 71 and the second outer plate electrode 72 are arranged along the outer periphery and the IC chip mounting portion 13 in the short side portion of the antenna coil 14 when viewed perpendicular to the film base 11. Further, the jumper wire 73 is branched off from the jumper wire 65, and connects the second outer plate electrode 72 and the second plate electrodes 63 and 64.

In the contactless communication medium 70 of the seventh embodiment, in addition to the contactless communication medium 60 of the sixth embodiment, the area of plate electrodes functioning as a capacitance portion can be further increased by arranging the plate electrodes (the first outer plate electrode 71 and the second outer plate electrode 72) while effectively using also a space necessarily formed on the outside of the long side portion of the antenna coil 14, and performance as a capacitance portion can be stabilized. Further, in the contactless communication medium 70, a structure omitting the first outer plate electrode 62 and the second outer plate electrode 64, namely, a structure of arranging the plate electrodes while effectively using only a space necessarily formed in the outside of the long side portion of the antenna coil 14, may be employed.

Eighth Embodiment

Figure 10A:
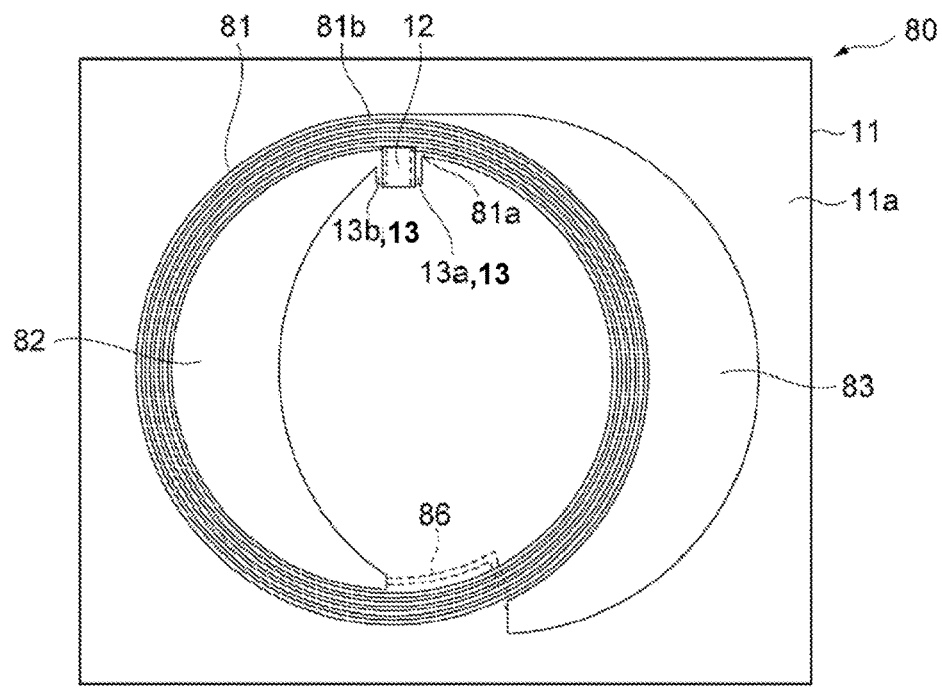
Figure 10B:
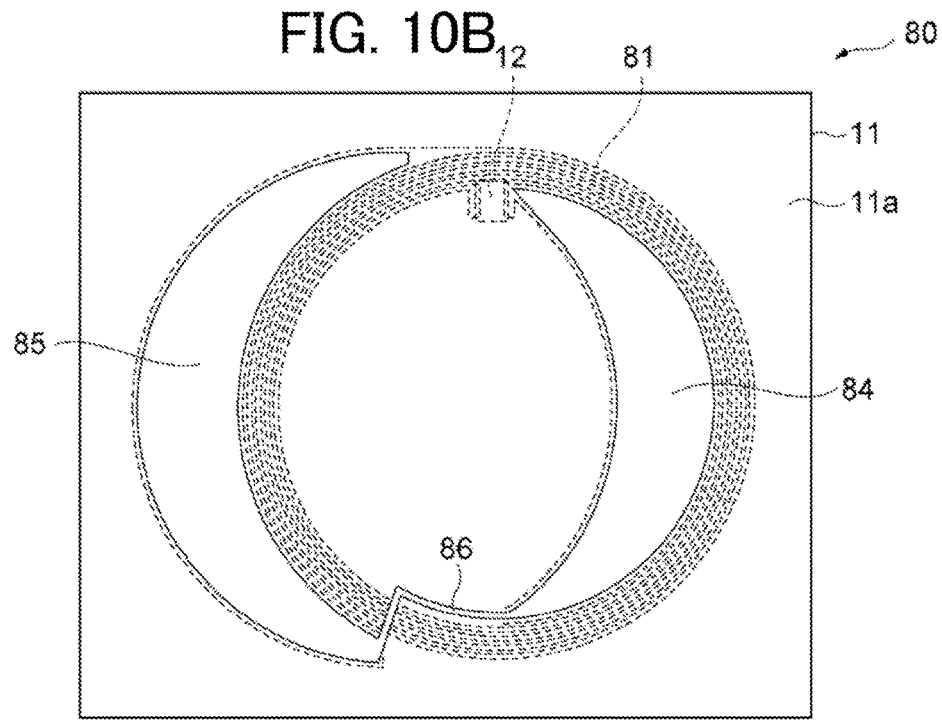
FIG. 10B is a rear view thereof, according to an eighth embodiment of the present invention.

Next, a contactless communication medium of an eighth embodiment of the present invention will be described with reference to FIG. 10A and FIG. 10B. FIG. 10A is a top view showing an internal structure of a contactless communication medium of the eighth embodiment of the present invention, and FIG. 10B is a rear view thereof. Further, FIG. 10B shows a rear side view thereof, where the top view shown in FIG. 10A is reversed about its central longitudinal axis. A contactless communication medium 80 of the present embodiment is different in shape from the contactless communication medium 10 of the first embodiment in that first plate electrodes 82 and 83, and second plate electrodes 84 and 85 are formed not in an "L" shape, but in a crescent shape, but is equivalent to the contactless communication medium 10 regarding its function as a circuit (which is to be described later in detail).

The first inner plate electrode 82 is a crescent shaped planar electrode formed in the inside of an antenna coil 81 which is a pattern formed in a circle on the top surface 11a of the film base 11. The first inner plate electrode 82 is arranged along substantially half of the inner periphery of the antenna coil 81 (i.e., at least a third or more of the entire length of the inner circumference of the antenna coil 81), so as to be adjacent to the inner periphery of the antenna coil 81 when viewed perpendicular to the film base 11. The first outer plate electrode 83 is a crescent shaped planar electrode formed on the outside of the antenna coil 81 which is a pattern formed in a circle on the top surface 11a of the film base 11. The first outer plate electrode 83 is arranged along substantially half of the outer periphery of the antenna coil 81 (i.e., at least a third or more of the entire length of the outer circumference of the antenna coil 81), so as to be adjacent to the outer periphery of the antenna coil 81 when viewed perpendicular to the film base 11.

As shown in FIG. 10A, a portion of the antenna coil 81 along which the first inner plate electrode 82 is arranged (i.e., the left half of an arc portion of the antenna coil 81) is different from a portion of the antenna coil 81 along which the first inner plate electrode 82 is arranged (i.e., the right half of the arc portion of the antenna coil 81 in an example of FIG. 10A). Namely, the first inner plate electrode 82 and the first outer plate electrode 83 are arranged such that they do not share the same portions of the antenna coil 81 (the arc portion). In other words, the first outer plate electrode 83 is arranged on the opposite side (i.e., point symmetrically) to the first inner plate electrode 82 with respect to a center point or a center line on the plane (surface 11a) of the film base 11, similarly to the first embodiment and the like. Further, this holds true for the arrangement relation between the second inner plate electrode 84 and the second outer plate electrode 85 as described later.

The second inner plate electrode 84 is a crescent-shaped planar electrode forming a pair with the first inner plate electrode 82, and is arranged on the rear surface 11b of the film base 11 so as to be opposite to the first inner plate electrode 82 in the thickness direction of the film base 11. The second inner plate electrode 84 extends along substantially half of the inner periphery of the antenna coil 81 (i.e., at least a third or more of the entire length of the inner circumference of the antenna coil 81) when viewed perpendicular to the film base 11, similarly to the first inner plate electrode 82. The second outer plate electrode 85 is a crescent-shaped planar electrode forming a pair with the first outer plate electrode 83, and is arranged on the rear surface 11*b* of the film base 11 so as to be opposite to the first outer plate electrode 83 in the thickness direction of the film base 11. The second outer plate electrode 85 extends along substantially half of the outer periphery of the antenna coil 81 (i.e., at least a third or more of the entire length of the outer circumference of the antenna coil 81) when viewed perpendicular to the film base 11, similarly to the first outer plate electrode 83. The second inner plate electrode 84 and the second outer plate electrode 85 are connected with a jumper wire 86.

The first plate electrodes 82 and 83 and the second plate electrodes 84 and 85 form each of the 2 capacitance portions by arranging the first plate electrodes 82 and 83 and the second plate electrodes 84 and 85 to be opposite to each other. In the present embodiment, as an example, the first plate electrodes 82 and 83, and the second plate electrodes 84 and 85 are arranged on the film base 11 such that the first plate electrodes 82 and 83 entirely cover the second plate electrodes 84 and 85 when viewed perpendicular to the film base 11. By arranging the plate electrodes as such, even when a slight misalignment in formation positions of the second plate electrodes 84 and 85 develops relative to formation positions of the first plate electrodes 82 and 83 due to manufacturing tolerance and the like, electrostatic capacitance of the parallel plates formed by both electrodes will not change, and an effect of reducing variance in electric properties of products can be expected.

The contactless communication medium 80 having such a structure constitutes an equivalent circuit of the contactless communication medium 10 shown in FIG. 3, where the antenna coil 14 is replaced by the antenna coil 81, the first capacitance portions 15 and 17 are replaced by the capacitance portions 82 and 84 formed by the first inner plate electrode 82 and the second inner plate electrode 84, the jumper wire 19 is replaced by the jumper wire 86, and the second capacitance portions 16 and 18 is replaced by the capacitance portions 83 and 85 formed by the first outer plate electrode 83 and the second outer plate electrode 85. As such, the contactless communication medium 80 is different from the contactless communication medium 10 of the first embodiment regarding the shape of each portion, but is equivalent thereto in the function as a circuit.

The pair of inner plate electrodes 82 and 84 consisting of the first inner plate electrode 82 and the second inner plate electrode 84 (namely, the pair of plate electrodes forming the capacitance portions 82 and 84), and the pair of outer plate electrodes 83 and 85 consisting of the first outer plate electrode 83 and the second outer plate electrodes 85 (namely, the pair of plate electrodes forming the capacitance portion 83 and 85) are arranged so as to pass an electric current along the same direction as the direction of an electric current passing through the antenna coil 81. Such an arrangement is realized by setting up the jumper wire 86 such that the electric current passing through the pair of inner plate electrodes 82 and 84, the jumper wire 86, and the pair of outer plate electrodes 83 and 85 passes in the same direction as the direction of the electric current passing through the antenna coil 81 when viewed perpendicular to the film base 11 (for example, a clockwise or counterclockwise direction when viewed in the top surface 11*a* side of the film base 11).

A flow of an electric current passing through the antenna coil 81 at a given instant is hereinafter described by providing an example of the case where the electric current passing through the antenna coil 81 flows from its outer end 81*b* toward its inner end 81*a*. As shown in of FIG. 10A, the electric current passing through the antenna coil 81 flows from its outer end 81*b* in a counterclockwise direction as shown in the figure, circles around the antenna coil 81 in a circular shape several times, (for example, 4 times in the present embodiment), and flows into the first inner plate electrode 82 via the inner end 81*a*, the IC chip mounting portion 13, and the IC chip 12. Further, the electric current flowing into the first inner plate electrode 82 returns to the outer end 81*b* of the antenna coil 81 via the pair of inner plate electrodes 82 and 84, the jumper wire 86, and the pair of outer plate electrodes 83 and 85. The direction of such electric current is a counterclockwise direction as shown in FIG. 10A, and therefore conforms to the direction of the electric current passing through the antenna coil 81.

As such, in the contactless communication medium 80 of the eighth embodiment, capacitance portions capable of propagating high-frequency signals are formed on both surfaces 11*a* and 11*b* of the film base 11 such that the first plate electrodes 82 and 83 and the second plate electrodes 84 and 85 are arranged disposed to each other. Further, the first plate electrodes 82 and 83 and the second plate electrodes 84 and 85 are arranged along roughly half or more of the inner periphery or the outer periphery of the antenna coil 81 so as to be adjacent to the inner periphery or the outer periphery of the antenna coil 81 formed in a circular spiral shape when viewed perpendicular to the film base 11. This arrangement of the plate electrodes enables the contactless communication medium to have parallel plate electrodes and an opening of the antenna coil 81 under the constraints imposed by the limited outer dimensions of the contactless communication medium.

Further, in the contactless communication medium 80 of the eighth embodiment, the pair of inner plate electrodes 82 and 84 and the pair of outer plate electrodes 83 and 85 are arranged such that, when viewed perpendicular to the film base 11, the portion (an arc portion) of the antenna coil 81 along which the pair of inner plate electrodes 82 and 84 are arranged is different from the portion (an arc portion) of the antenna coil 81 along which the pair of outer plate electrodes 83 and 85 are arranged. In this case, the pair of inner plate electrodes 82 and 84 in the inside of the antenna coil 81, and the pair of outer plate electrodes 83 and 85 of the antenna coil 81 are arranged such that they do not share the same portions of the antenna coil 81. Namely, the pair of inner plate electrodes 82 and 84 and the pair of outer plate electrodes 83 and 85 are arranged such that they are not adjacent to each other and do not sandwich the same portion of the antenna coil 14 therebetween. Thereby, the antenna coil 81, the pair of inner plate electrodes 82 and 84, and the pair of outer plate electrodes 83 and 85 can be arranged on the film base 11 with balance. Specifically, the antenna coil 81, and the plate electrodes 82, 83, 84, and 85 can be appropriately arranged in an equally spaced and annular antenna pattern arrangement area as set in a standard (for example, ISO/IEC 14443-1, Class 1) and the like.

Further, in the contactless communication medium 80 of the eighth embodiment, the pair of inner plate electrodes 82 and 84, and the pair of outer plate electrodes 83 and 85 are arranged so as to pass an electric current along the same direction as the electric current passing through the antenna coil 81 as described above. The effective number of coil turns can be increased by having the pair of inner plate electrodes 82 and 84 and the pair of outer plate electrodes 83 and 85 function as radiating elements that pass an electric current along the same direction as the direction of an electric current passing through the antenna coil 81. In the example of FIG. 10A and FIG. 10B, the number of turns of the antenna coil 81 is 4. However, the effective number of coil turns is increased by 1 due to the plate electrodes 82, 83, 84, and 85, and the jumper wire 86, and an antenna function equivalent to that of the antenna coil 81 but having 5 turns can be provided. Thus, it is possible to reduce the number of turns (namely, the area of an antenna pattern) required of the antenna coil 81 due to the effectively increased number of coil turns, and the area of the opening of the antenna coil 81 can be increased.

Accordingly, as in the case of the contactless communication medium 80 of the eighth embodiment, where the antenna coil 81 is patterned in a circular shape, and the plate electrodes 82, 83, 84, and 85 are tailored to the circular shaped antenna coil 81, it is possible to produce similar effects to those produced in the contactless communication medium 10 of the first embodiment. Further, in the contactless communication medium 80, by pattern forming the antenna coil 81 in a circular shape, the film base 11 in the contactless communication medium 80 is closer in shape to a square than the film base 11 in the contactless communication medium 10 where the antenna coil 14 is formed in a rectangular shape. Thereby, the contactless communication medium 80 can be appropriately used as a contactless communication medium incorporated into a circular object in a planar view of, for example, of a token (coin) of a casino and the like.

Further, present embodiment is illustrated by an example where the pair of inner plate electrodes 82 and 84 are arranged along substantially half of the inner periphery of the antenna coil 81 when viewed perpendicular to the film base 11, and the pair of outer plate electrodes 83 and 85 are arranged along substantially half of the outer periphery of the antenna coil 81 when viewed perpendicular to the film base 11. However, the pair of inner plate electrodes may be arranged along about more than half of the inner periphery of the antenna coil 81 when viewed perpendicular to the film base 11, while the pair of outer plate electrodes 83 and 85 may not be arranged along substantially half of the outer periphery of the antenna coil 81 when viewed perpendicular to the film base 11. Further, the pair of outer plate electrodes 83 and 85 may be arranged along about more than half of the outer periphery of the antenna coil 81 when viewed perpendicular to the film base 11, while the pair of inner plate electrodes may not be arranged along about more than half of the inner periphery of the antenna coil 81 when viewed perpendicular to the film base 11. Namely, it is only necessary that at least one of the pair of inner plate electrodes and the pair of outer plate electrodes are arranged along about more than half of the inner periphery or the outer periphery of the antenna coil 81. Further, the shape of the antenna coil 81 may not be a circular shape, but an elliptic shape, or it may have a polygonal shape. In the case of using an antenna coil having such a shape other than a circular shape, a structure of a contactless communication medium based on the idea similar to the content described in the present embodiment may be adopted.

Ninth Embodiment

Figure 11A:
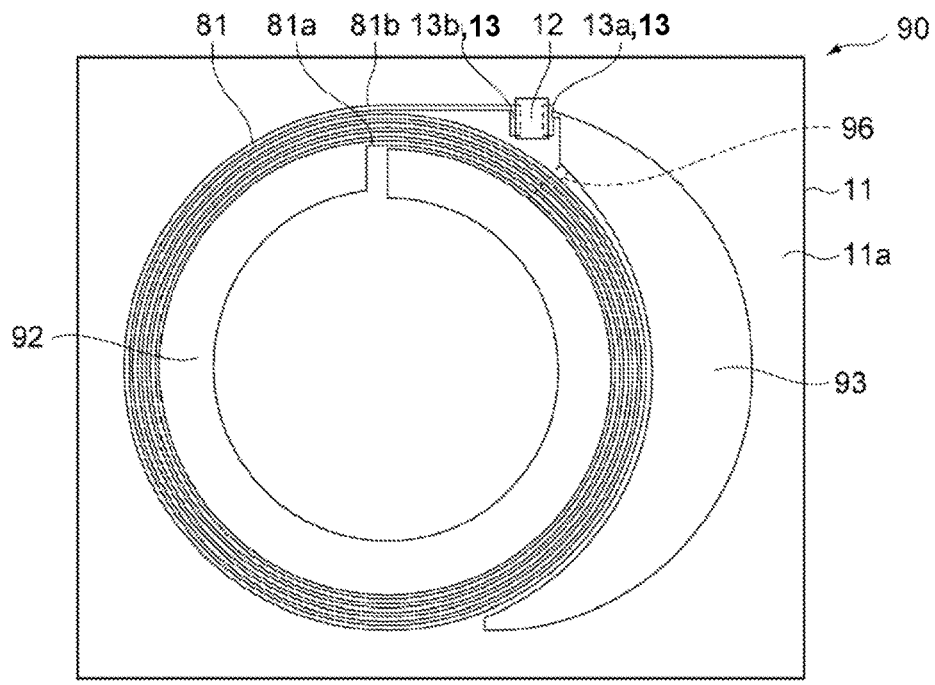
Figure 11B:
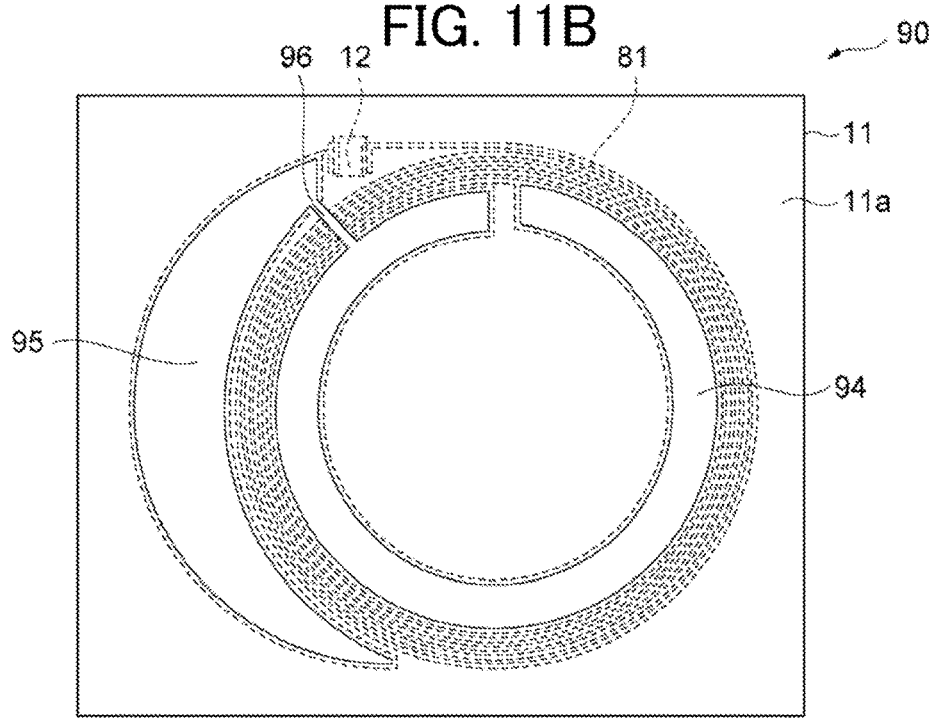
FIG. 11B is a rear view thereof, according to a ninth embodiment of the present invention.

Next, a contactless communication medium of a ninth embodiment of the present invention will be described with reference to FIG. 11A and FIG. 11B. FIG. 11A is a top view showing an internal structure of a contactless communication medium of a ninth embodiment of the present invention, and FIG. 11B is a rear view thereof. Further, FIG. 11B shows a rear side view thereof, where the top view shown in FIG. 11A is reversed about its central longitudinal axis. A contactless communication medium 90 of the present embodiment is primarily different from the contactless communication medium 80 of the eighth embodiment in that the IC chip mounting portion 13 is arranged on the outside of the antenna coil 81 when viewed perpendicular to the film base 11. Further, the contactless communication medium 90 is primarily different from the contactless communication medium 80 of the eighth embodiment in that the pair of crescent-shaped inner plate electrodes 82 and 84 are replaced by a pair of inner plate electrodes 92 and 94 formed along nearly the entire inner circumference of the antenna coil 81 when viewed perpendicular to the film base 11

The first inner plate electrode 92 is arranged along nearly the entire inner periphery of the antenna coil 81 so as to be adjacent to the inner periphery of the antenna coil 81 when viewed perpendicular to the film base 11. On the other hand, the first outer plate electrode 93 is arranged along substantially half of the outer periphery of the antenna coil 81 so as to be adjacent to the outer periphery of the antenna coil 81 when viewed perpendicular to the film base 11, similarly to the first outer plate electrode 83 in the contactless communication medium 80 of the eighth embodiment. The second plate electrodes 94 and 95 are formed on the rear surface 11b of the film base 11 so as to be opposite to the first plate electrodes 92 and 93 in the thickness direction of the film base 11. The second inner plate electrode 94 and the second outer plate electrode 95 are connected with a jumper wire 96.

A flow of an electric current passing through the antenna coil 81 of the contactless communication medium 90 at a given instant is hereinafter described by providing an example of the case where the electric current passing through the antenna coil 81 flows from its outer end 81b toward its inner end 81a. As shown in FIG. 11A, the electric current passing through the antenna coil 81 flows from its outer end 81b in a counterclockwise direction as shown in the figure, circles around the antenna coil 81 in a circular shape several times, (for example, 4 times in the present embodiment), and flows into the first inner plate electrode 92 from the inner end 81a. Further, the electric current flowing into the first inner plate electrode 92 returns to the outer end 14b of the antenna coil 14 via the pair of inner plate electrodes 92 and 94, the jumper wire 96, and the pair of outer plate electrodes 93 and 95. As described above, the pair of inner plate electrodes 92 and 94 are formed in a shape almost making a circle counterclockwise, as shown in FIG. 11A, along the inner periphery of the antenna coil 81 when viewed perpendicular to the film base 11. Therefore, the direction of the electric current passing through the pair of inner plate electrodes 92 and 94 conforms to the direction of the electric current passing through the antenna coil 81.

As such, in the contactless communication medium 90, the pair of inner plate electrodes 92 and 94 are arranged so as to pass the electric current in the same direction as the direction of the electric current passing through the antenna coil 81. The effective number of coil turns can be increased by having the pair of inner plate electrodes 92 and 94 function as a radiating element that passes an electric current along the same direction as the direction of an electric current passing through the antenna coil 81. Thus, it is possible to reduce the number of turns required of the antenna coil 81 due to the effectively increased number of coil turns, and the area of the opening of the antenna coil 81 can be increased. On the other hand, in this example, the pair of outer plate electrodes 93 and 95 do not function as a radiating element, but purely function as a capacitance portion.

According to the contactless communication medium 90 of the ninth embodiment, it is possible to increase the area of the opening of the antenna coil 81 by arranging relatively large parts such as the IC chip mounting portion 13 and the IC chip 12 mounted on the IC chip mounting portion 13 not in the inside, but on the outside of the antenna coil 81.

The contactless communication medium of the present embodiment may be as described above, but the contactless communication medium of the present invention is not limited to the embodiment described above, and various modifications can be applied. For example, the structure of each portion described in the first to ninth embodiments described above can be adequately combined in aspects other than the combinations adopted in the embodiments described above. Further, the contactless communication media described above may include not only a contactless IC card, but also, for example, contactless communication media such as an electronic passport and the like, and are not particularly limited. The same holds true for the following modifications.

[Modifications]

Contactless communication mediums (contactless information mediums) according to further embodiments of the present invention will be described with reference to the drawings. In the description, the same sign may be assigned for an element having the same element or the same function, and repeated description will be omitted.

[First Modification]

Figure 13A:
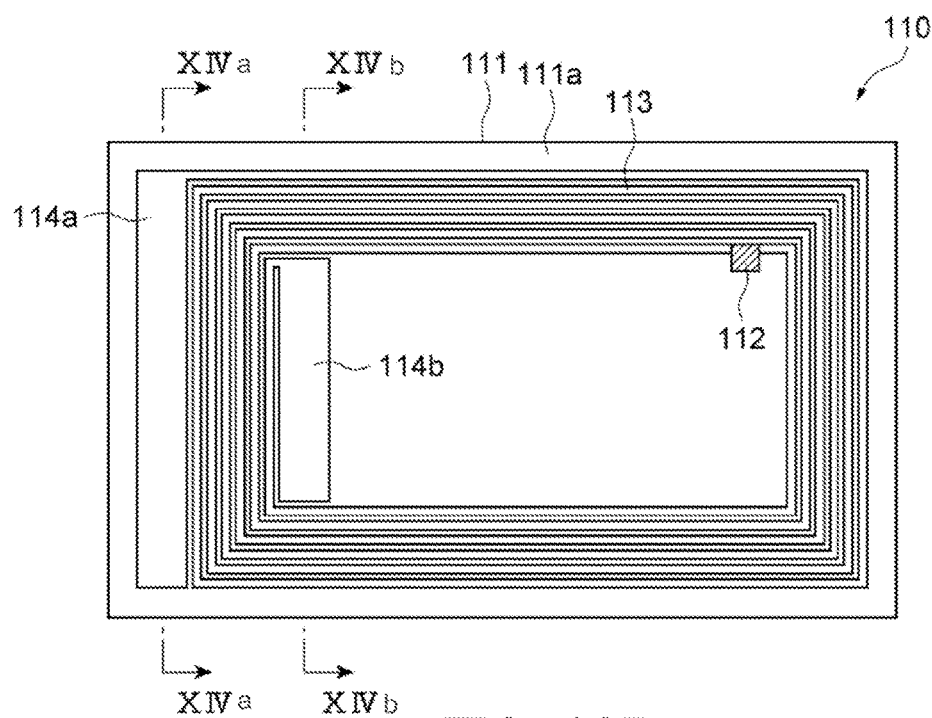
Figure 13B:
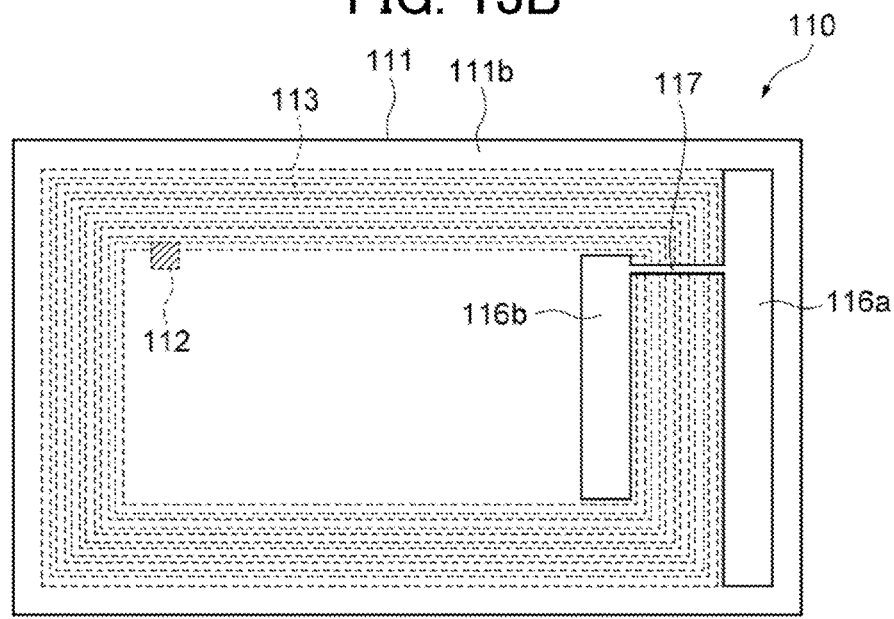
FIG. 13B is a rear view thereof, according to a first modification of the present invention.
Figure 15:
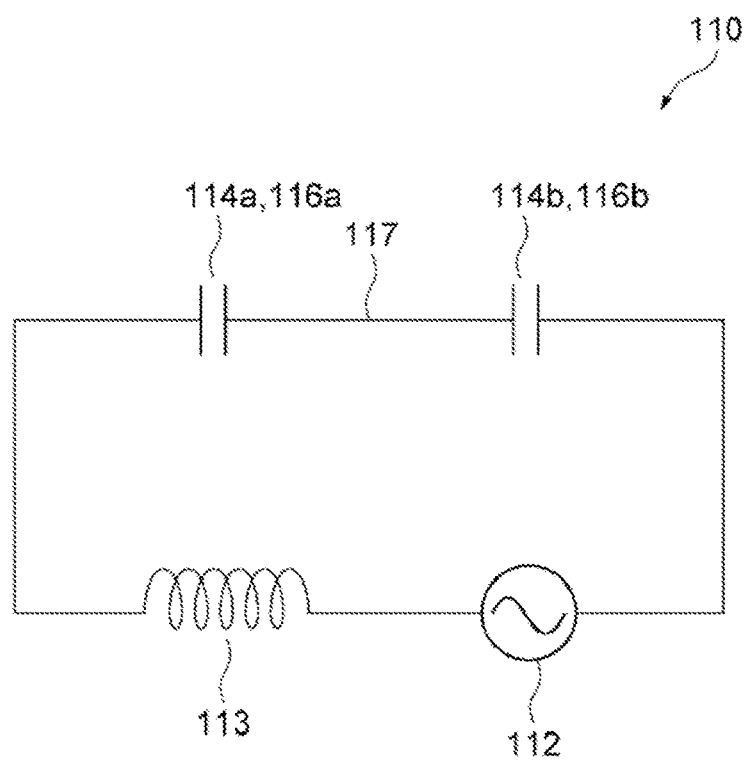
FIG. 15 is a circuit diagram showing an equivalent circuit of the contactless communication medium shown in FIG. 13A and FIG. 13B.

First, a contactless communication medium (contactless information medium) of a first modification will be described with reference to FIG. 13A to FIG. 15. FIG. 13A is a top view showing an internal structure of a contactless communication medium of the first modification, and FIG. 13B is a rear view thereof. FIG. 14A is a cross sectional view of the contactless communication medium shown in FIG. 13A and FIG. 13B along the line XIVa-XIVa, and FIG. 14B is a cross sectional view of the contactless communication medium shown in FIG. 13A and FIG. 13B along the line XIVb-XIVb. FIG. 15 is a circuit diagram showing an equivalent circuit of the contactless communication medium shown in FIG. 13A and FIG. 13B. Further, FIG. 13B shows a rear side view of the view shown in FIG. 13A where the view is reversed about its central longitudinal axis.

A contactless communication medium 110 is a wireless communication medium with RFID capable of performing contactless communication with an external read/write device such as a reader/writer while applying RFID technology and using signals primarily in the HF band. The contactless communication medium 110 has a rectangular shaped film base 111 as shown in FIG. 13A through FIG. 14B. An IC chip 112, an antenna coil 113, and first plate electrodes 114a and 114b are arranged on a top surface 111a of the film base 111, and second plate electrodes 116a and 116b, and a jumper wire 117 are arranged on a rear surface 111b of the film base 111.

The film base 111 is a base made up of dielectric and having, for example, a triple-layer structure, and has a structure having an intermediate base 111c as the main base having insulating properties and durability such as polyethylene naphthalate (PEN), polyethylene terephthalate copolymer (PET-G) and the like. On both the front and rear surfaces of the intermediate base 111c, first and second dielectric layers 111d and 111e, having a smaller thickness than that of the intermediate base 111c, are provided for adjustment. Further, details of the first and second dielectric layers 111d and 111e will be described later.

A metal foil is laminated on both the front and rear surfaces 111a and 111b of the film base 111 prior to processing by etching and the like, and the antenna coil 113, the first plate electrodes 114a and 114b, the second plate electrodes 116a and 116b, and the jumper wire 117 are formed by processing the metal foil such as by etching. The metal foil arranged on each of the front and rear surfaces 111a and 111b of the film base 111 may have the same thickness, or the thickness of the metal foil on the top surface 111a side where the antenna coil 113 is arranged may be made larger than the thickness of the metal foil on the rear surface 111b side where the second plate electrodes 116a and 116b are arranged, since the antenna coil 113 is arranged with a small pitch and the electrical resistance of the antenna coil 113 needs to be reduced. Further, such a three-layer structure may obviously be applied to the contactless communication medium 10 and the like of the first embodiment to the ninth embodiment described above.

The IC chip 112 is constituted by an IC tag storing, for example, ID information. The IC chip 112 is arranged along a length of the antenna coil antenna coil 113 on the top surface 111a of the film base 111, and both its terminals are connected to the antenna coil 113. The IC chip 112 performs wireless communication processing via the conducted antenna coil 113, and sends and receives predetermined signals to and from an external read/write device.

The antenna coil 113 is a plane spiral shaped antenna for performing contactless wireless communication by electromagnetically coupling with an antenna of an external read/write device such as a reader/writer. The antenna coil 113 sends and receives signals and receives power by wireless communication in a contactless state. The antenna coil 113 is formed from a conductor (metal foil) arranged on the top surface 111a of the film base 111. Specifically, the antenna coil 113 is patterned, for example, by etching a copper foil or an aluminum foil having a thickness of 5 μm to 50 μm laminated on the top surface 111a side of the film base 111 having a thickness of 15 μm to 50 μm. Such an antenna coil 113 is connected to the plate electrode 114a at its outer end, and is connected to the plate electrode 114b at its inner end.

The first plate electrodes 114a and 114b are each a rectangular shaped plate electrode, and are arranged in parallel at one side of the top surface 111a of the film base 111 sandwiching a portion of the antenna coil 113 therebetween. The plate electrode 114b is formed in the inside of the antenna coil 113, and therefore its electrode area is smaller than that of the plate electrode 114a. However, the electrode areas of plate electrodes 114a and 114b may be the same, or the electrode area of the plate electrode 114b may be larger than that of the plate electrode 114a. Further, the plate electrode 114a is connected to the outer end of the antenna coil 113 as described above, and the plate electrode 114b is connected to the inner end of the antenna coil 113. Further, the first plate electrodes 114a and 114b are patterned by etching the metal foil laminated on the top surface 111a side of the film base 111 similarly to the antenna coil 113. The second plate electrodes 116a and 116b, and the jumper wire 117 to be described later are also similarly formed.

The second plate electrodes 116a and 116b are each a rectangular plate electrode, and are arranged in parallel at one side of the rear surface 111b of the film base 111, with a portion of the region corresponding to the antenna coil 113 located therebetween. The plate electrode 116b is formed in the inside of the region corresponding to the antenna coil 113 (region of the antenna coil 113 shown by dotted lines in FIG.

13B), and therefore its electrode area is smaller than that of the plate electrode 116a, which is, however, not limited, similarly to the first plate electrodes 114a and 114b. Further, as shown in FIG. 14A and FIG. 14B, the second plate electrodes 116a and 116b are formed so as to be opposite to the first plate electrodes 114a and 114b in the thickness direction of the film base 111. More specifically, the plate electrode 114a and the plate electrode 116a are opposite to each other, and the plate electrode 114b and the plate electrode 116b are opposite to each other. With such an arrangement, the first plate electrodes 114a and 114b, and the second plate electrodes 116a and 116b each form 2 capacitance portions (see FIG. 15).

Further, plate electrodes 114a and 116a opposite to each other have the same shape and the same size (area), and plate electrodes 114b and 116b opposite to each other similarly have the same shape and the same size. Further, each plate electrode of these first plate electrodes 114a and 114b, and the second plate electrodes 116a and 116b are in conformity when viewed perpendicular to the film base 111. Further, the second plate electrodes 116a and 116b, unlike the first plate electrodes 114a and 114b, are not connected to the antenna coil 113.

The jumper wire 117 is a wire which connects the second plate electrodes 116a and 116b on the rear surface 11b of the film base 111. The jumper wire 117 preferably has a small electrostatic capacitance between it and a portion of the antenna coil 113 opposite to the jumper wire 117, and therefore its width is preferably as small as possible, for example, in the order of 1 to 3 mm. By such a jumper wire 117, conduction between the plate electrode 116a and the plate electrode 116b is achieved. Further, in the example shown in FIG. 13B, the jumper wire 117 is connected to the plate electrodes 116a and 116b in the long side direction of the plate electrodes 116a and 116b shown in the upper portion of the figure, but it may be connected at other portions such as a central portion.

The contactless communication medium 110 having such a structure can be expressed as an equivalent circuit as shown in FIG. 15. Namely, as shown in FIG. 15, the contactless communication medium 110 is constituted by a circuit having the IC chip 112, the antenna coil 113, the first capacitance portion 114a and 116a, the jumper wire 117, and the second capacitance portion 114b and 116b arranged in this order.

Here, a layer structure of the film base 111 of the contactless communication medium 110 having such a structure, and effects and functions produced thereby will be further described in detail with reference to FIG. 14A and FIG. 14B.

As shown in FIG. 14A and FIG. 14B, the film base 111 constituting the contactless communication medium 110 has a three-layer structure having, in addition to the intermediate base 111c which is the primary base, a first dielectric layer for adjustment 111d comprising dielectric and formed on a surface of the intermediate base 111c shown in the upper portion of the figure, and a second dielectric layer for adjustment 111e comprising dielectric and formed on a surface of the intermediate base 111c shown in the lower portion of the figure. The reason that the film base 111 has such a three-layer structure in the contactless communication medium 110 of the present modification is to enable adjustment by simple means of the electrostatic capacitance values of the capacitance portion (capacitor) formed by the first and second plate electrodes 114a and 116a, and the capacitance portion (capacitor) formed by the first and second plate electrodes 114b and 116b, by adjusting the thickness, dielectric constant and the like of the first and second dielectric layers 111d and 111e. The first and second dielectric layers 111d and 111e are layers for adjusting the electrostatic capacitance value, and from the perspective of making the contactless communication medium 110 thinner, it is preferable that it is thinner than the thickness of the intermediate base 111c, which is not limited.

In order to enable adjustment of such an electrostatic capacitance value, the dielectric material constituting the first and second dielectric layers 111d and 111e may be constituted by a different material from a dielectric material of the intermediate base 111c, for example, comprising PET and the like, but may be constituted by the same material. A material constituting the first and second dielectric layers 111d and 111e includes, for example, polyester-based resin, polyether-based resin, polyethylene, polypropylene, EVA resin and the like. The first and second dielectric layers 111d and 111e may be formed by coating such dielectric material on both the front and rear surfaces of the intermediate base 111c, followed by curing. In the case of adopting such a production method, the thicknesses and the materials used (i.e., dielectric constant) of the first and second dielectric layers 111d and 111e can be adequately adjusted. Further, the film base 111 of such a three-layer structure may obviously be adopted in the structure of the film base 111 used in the first embodiment to the ninth embodiment described above, and by adopting the structure of the film base 111 in the film base 11, it is possible to similarly produce the same functions, effects and the like to be described later in the contactless communication medium and the like of the first embodiment to the ninth embodiment.

Thus, in the contactless communication medium 110 of the present embodiment, the film base 111 sandwiched between the first plate electrodes 114a and 114b and the second plate electrodes 116a and 116b has a three-layer structure having the intermediate base 111c, and the first and second dielectric layers 111d and 111e. Therefore, the thickness of the film base 111 comprising the dielectric, namely the separation distances between the first and second plate electrodes 114a and 116a, and between 114b and 116b can be easily adjusted, for example, by changing the thickness of the first and second dielectric layers 111d and 111e, and it is possible to easily adjust the capacitances of the capacitors made of the first and second plate electrodes 114a, 114b, 116a, and 116b without changing the shapes (areas) and the like of the electrode pattern of the plate electrodes 114a, 114b, 116a, and 116b constituting the capacitors. Further, in the contactless communication medium 110, the structure is such that conduction is achieved with capacitors formed between the first plate electrodes 114a and 114b connected to the antenna coil 113, and the second plate electrodes 116a and 116b arranged on the rear surface side, and therefore production and inspection processes can be simplified and connection reliability can be improved compared to the case where the start end and the finish end of the antenna coil 113 are directly connected to a conductor pattern on the rear surface side.

Further, in the contactless communication medium 110, the dielectric constants of the dielectrics constituting the first and second dielectric layers 111d and 111e are equivalent to or more than the dielectric constant of the dielectric constituting the intermediate base 111c. Therefore, even when the layer thicknesses of the first and second dielectric layers for adjustment 111d and 111e are small, the capacitances of the capacitors made of the first and second plate electrodes 114a, 114b, 116a, and 116b can be easily adjusted.

Further, in the contactless communication medium 110, the thicknesses of the first and second dielectric layers 111*d* and 111*e* are smaller than the thickness of the intermediate base 111*c*. As such, the dielectric layers for adjustment for adjusting the capacitances of the capacitors made of the first and second plate electrodes 114*a*, 114*b*, 116*a*, and 116*b* can be made thin, and therefore it is possible to control the variance in total thickness of the film base 111 in each product. Further, the whole contactless communication medium 110 can be made thinner.

Further, in the contactless communication medium 110, for example, the first and second dielectric layers 111*d* and 111*e* are formed by coating a predetermined dielectric material on the intermediate base 111*c*, followed by curing. As such, the thicknesses, dielectric constants and the like of the first and second dielectric layers 111*d* and 111*e* can be easily adjusted, and therefore it is possible to easily adjust the capacitances of the capacitors made of the first and second dielectric layers 114*a*, 114*b*, 116*a*, and 116*b*.

Further, in the contactless communication medium 110, the thickness of the metal foil constituting the antenna coil 113 is larger than the thickness of the metal foil constituting the second plate electrode 116*a* and 116*b*. As such, electrical resistance in the antenna coil 113 can be reduced, and it is possible to improve the radiation efficiency of the antenna of the contactless communication medium 110. Further, this structure may be adopted in the structure of the contactless communication medium used in the first embodiment to the ninth embodiment of the present invention described above.

Figure 16A:
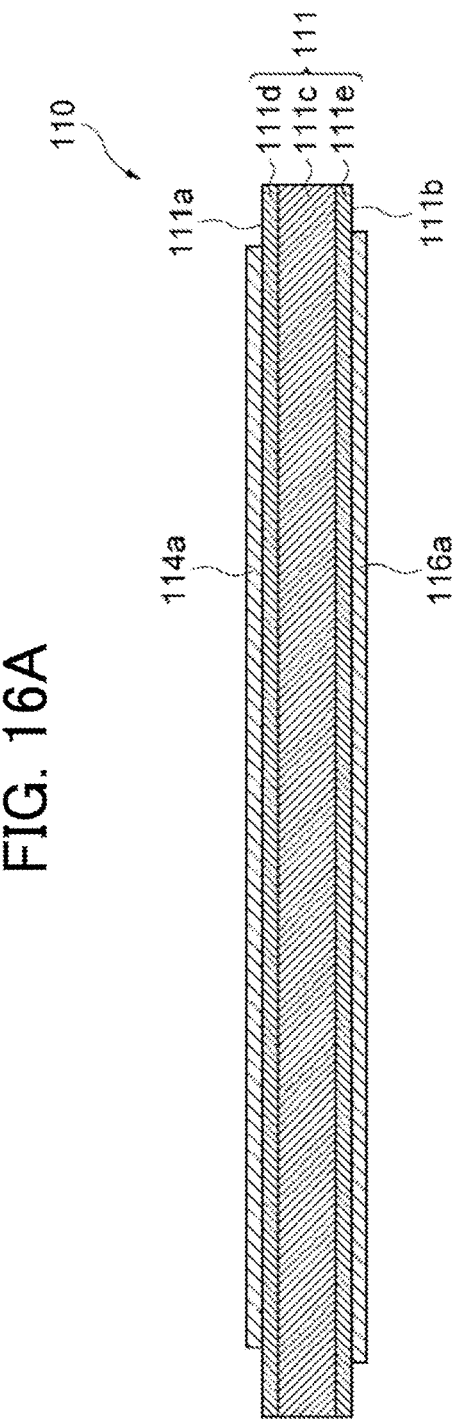
Figure 16B:
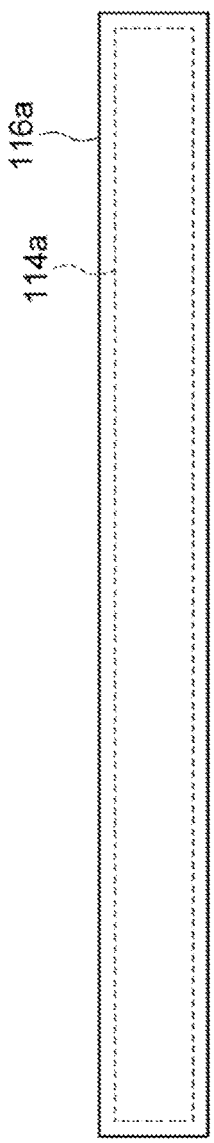
FIG. 16B is a diagram schematically showing the relationship between sizes of each plate electrode, according to the first modification.

Further, in the example described above, an example where the areas in the plane of the plate electrodes 114*a* and 116*a* constituting a capacitor of the contactless communication medium 110 conform to each other, and concurrently the areas in the plane of the plate electrodes 114*b* and 116*b* constituting another capacitor conform to each other is shown. However, the present invention is not limited to this. For example, as shown in FIG. 16A and FIG. 16B, the area in the plane of the second plate electrode 116*a* arranged on the rear surface 111*b* side may be larger than the area in the plane of the first plate electrode 114*a*, and that, when viewed in a direction perpendicular to the plane of the first and second plate electrodes 114*a* and 116*a*, the first plate electrode 114*a* may be surrounded by the second plate electrode 116*a*. When forming each of the first and second plate electrodes 114*a* and 116*a* on either surface, a position and the like of both plate electrodes 114*a* and 116*a* may be somewhat misaligned from designed values due to production errors and the like. By adopting the structure described above, even in the case where the arrangement positions of the first and second plate electrodes are somewhat misaligned from the designed values, it is possible to have a capacitor with a predetermined capacitance value.

Figure 17A:
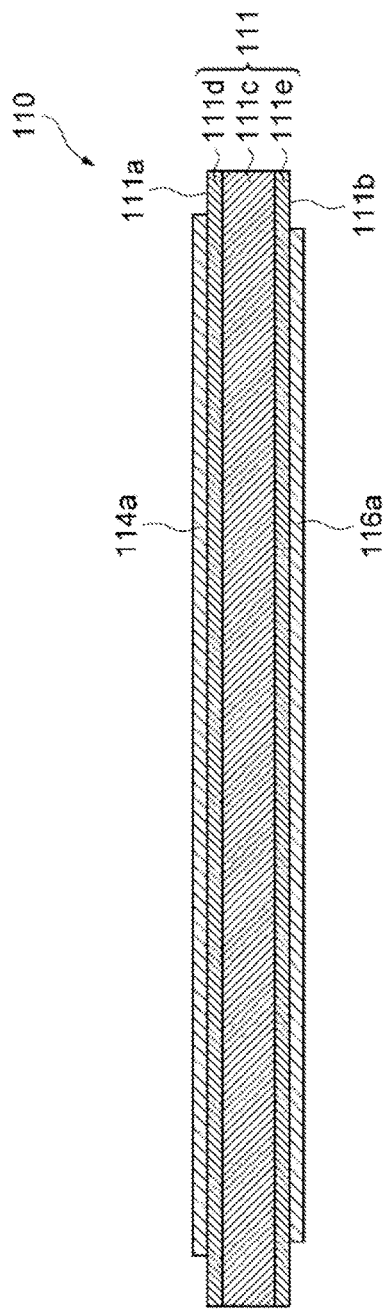
Figure 17B:
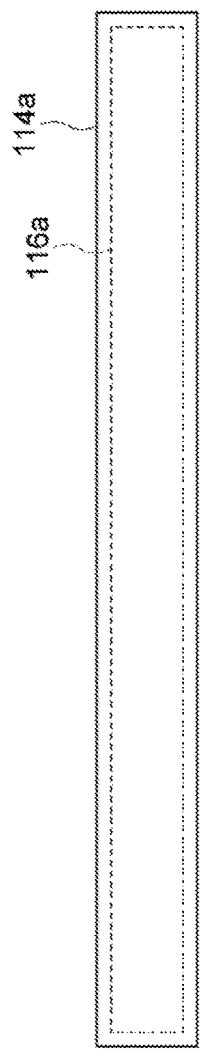
FIG. 17B is a diagram schematically showing the relationship between sizes of each plate electrode, according to the first modification.

Further, to the contrary, as shown in FIG. 17A and FIG. 17B, the area in the plane of the first plate electrode 114*a* may be larger than the area in the plane of the second plate electrode 116*a*, and that, when viewed perpendicular to the plane of the first and second plate electrodes 114*a* and 116*a*, the second plate electrode 116*a* may be surrounded by the first plate electrode 114*a*. However, the antenna coil 113 is also formed on the same side as the first plate electrode 114*a*, and therefore, by making the size of the second plate electrode 116*a* larger, the contactless information medium 110 as a whole is likely to be downsized. Further, a relation between areas of the first and second plate electrodes 114*a* and 116*a* was described above, but the same holds true for a relation between areas of the first and second plate electrodes 114*b* and 116*b*.

[Second Modification]

Figure 18A:
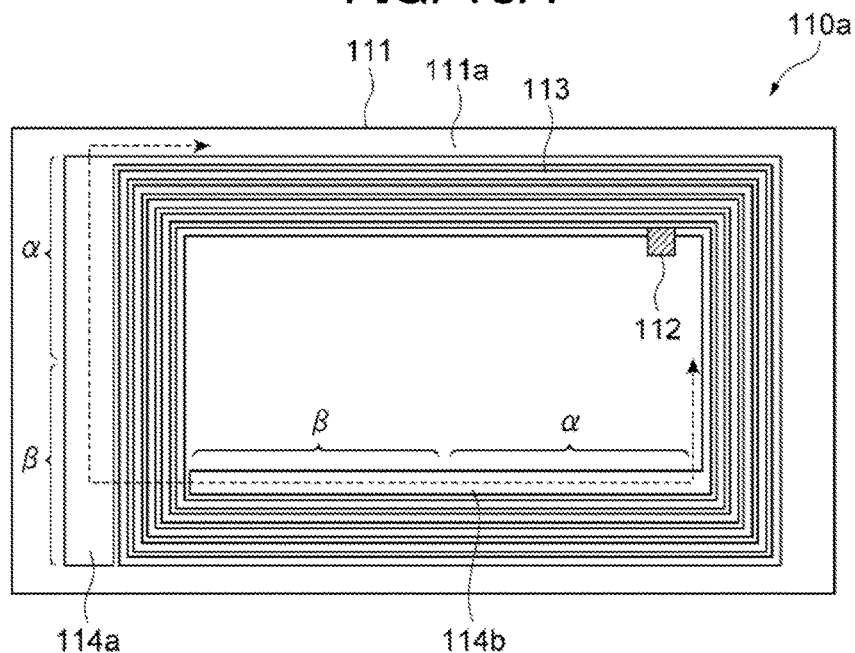
Figure 18B:
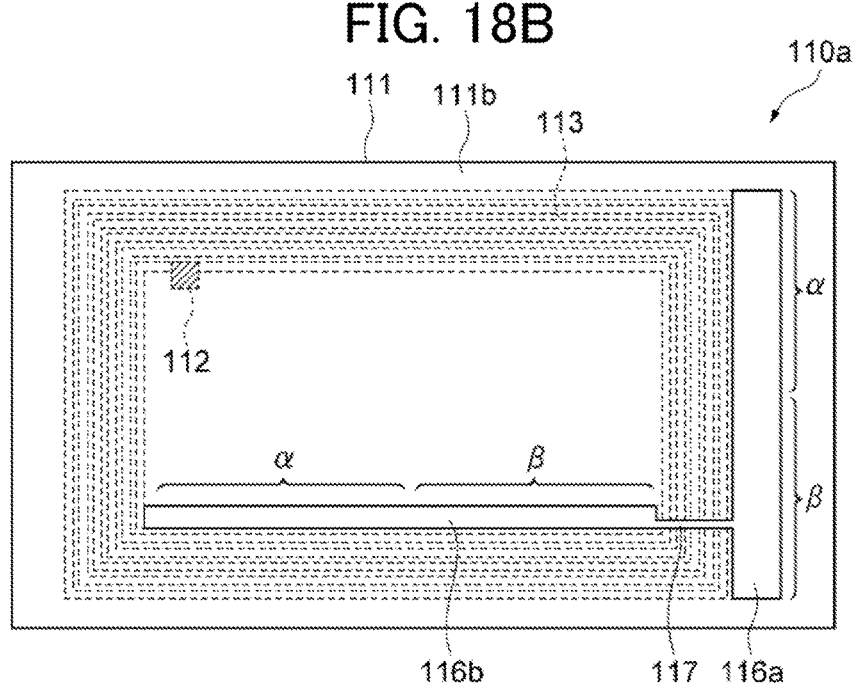
FIG. 18B is a rear view thereof, according to a second modification.
Figure 19:
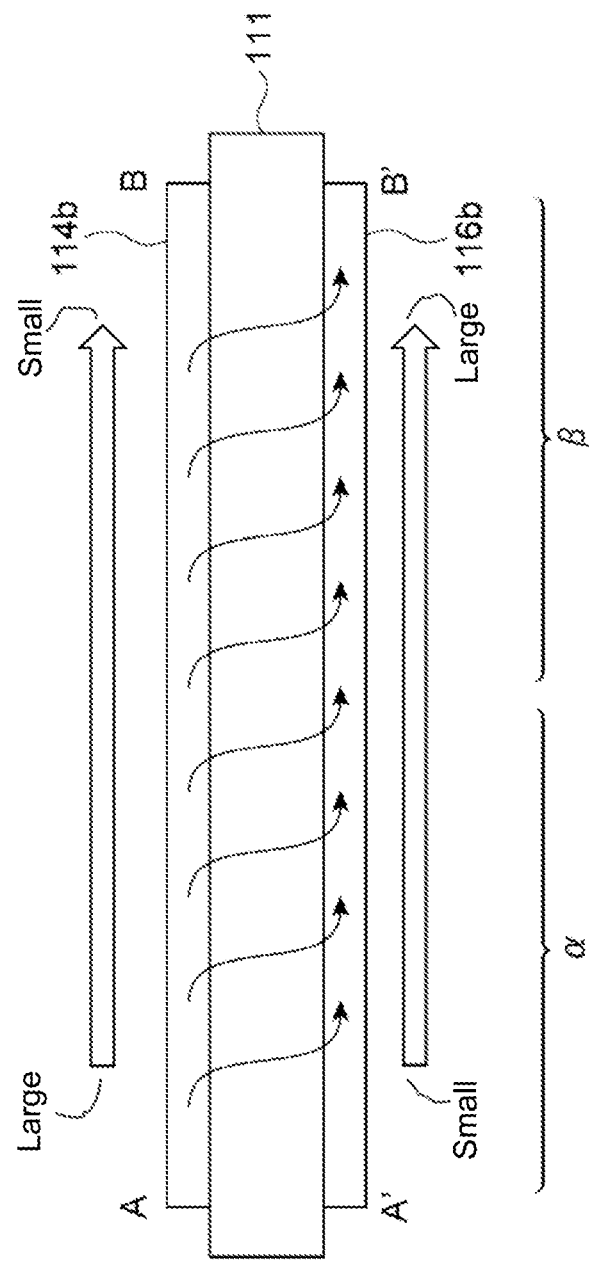
FIG. 19 is a cross-sectional view of the contactless communication medium shown in FIG. 18A and FIG. 18B, schematically showing the flow of an electric current between plate electrodes.
Figure 20:
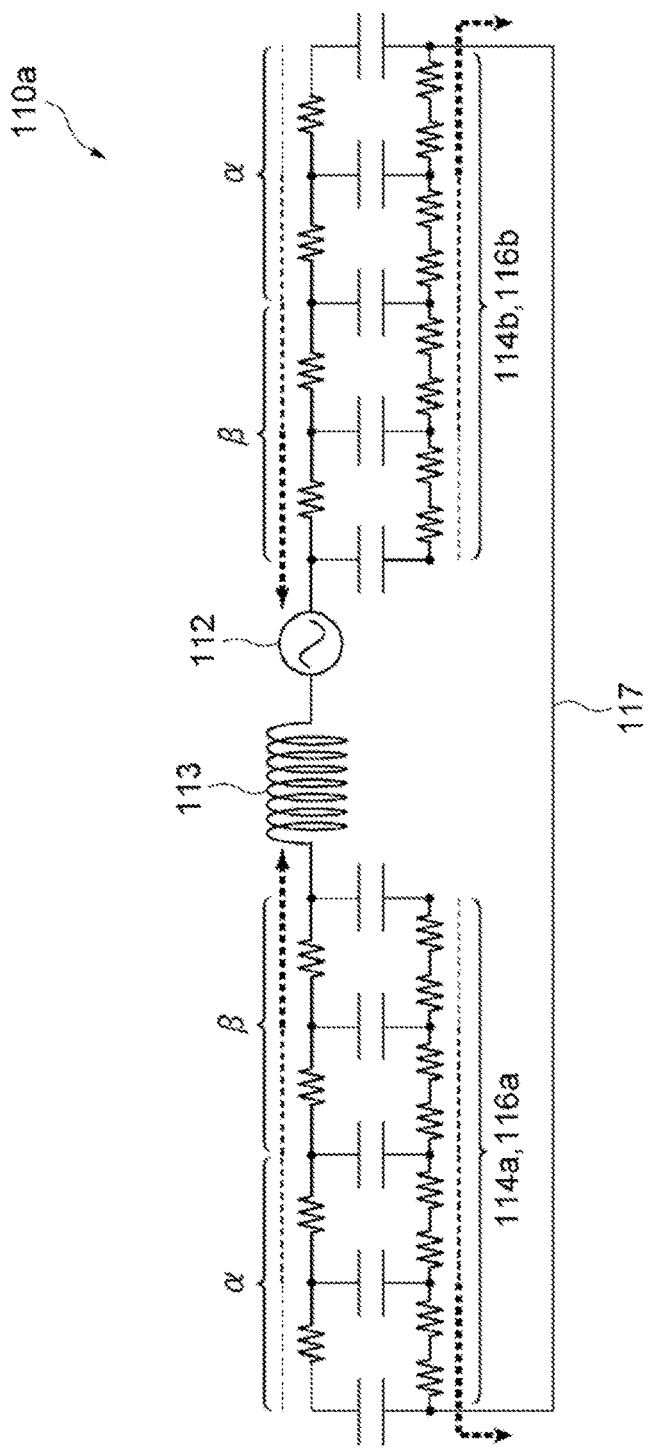
FIG. 20 is a circuit diagram showing an equivalent circuit of the contactless communication medium shown in FIG. 18A and FIG. 18B.

Next, a contactless communication medium of a second modification will be described with reference to FIG. 18A to FIG. 20. FIG. 19 is a cross sectional view schematically showing a flow of an electric current between plate electrodes of the contactless communication medium shown in FIG. 18A and FIG. 18B. FIG. 20 is a circuit diagram showing an equivalent circuit of the contactless communication medium shown in FIG. 18A and FIG. 18B. As shown in FIG. 18A and FIG. 18B, the contactless communication medium 110*a* has the film base 111, the IC chip 112, the antenna coil 113, the first plate electrodes 114*a* and 114*b*, the second plate electrodes 116*a* and 116*b*, and the jumper wire 117, similarly to the first modification.

On the other hand, as shown in FIG. 18A and FIG. 18B, in the contactless communication medium 110*a*, unlike the first modification, plate electrodes 114*a*, 114*b*, 116*a*, and 116*b* are formed on a flow path of an electric current passing through the antenna coil 113 and constituting a portion of a coil pattern. The plate electrodes 114*a*, 114*b*, 116*a*, and 116*b* are included in the coil pattern including the antenna coil 113, and therefore, for example as shown in FIG. 19, an electric current passes from the plate electrode 114*b* to the plate electrode 116*b* across the film base 111. As such, the electric current passes along the travelling direction indicated by arrows in the figure, and therefore the amount of electric current passing through the first plate electrode 114*b* is larger than the amount of electric current passing through the second plate electrode 116*b* in region α, whereas the amount of electric current passing through the second plate electrode 116*b* is larger than the amount of electric current passing through the first plate electrode 114*b* in region β. The relation between the amounts of electric currents holds true between the planar electrodes 114*a* and 116*a*. Further, an average electric current density in an electrode cross section of each of the plate electrodes 114*a*, 114*b*, 116*a*, and 116*b* may be used as an index in place of the amount of electric current, similarly to the case of using the amount of electric current. As such, in the case where the first and second plate electrodes 114*a*, 114*b*, 116*a*, and 116*b* are formed on a flow path of an electric current passing through the antenna coil 113 and constituting a portion of the coil pattern, the plate electrodes 114*a*, 114*b*, 116*a*, and 116*b* can be used as a portion of the antenna, and under the limited antenna forming region, it is possible to increase the number of coil turns and concurrently enlarge the opening area of the antenna. Further, an equivalent circuit of such a contactless communication medium 110*a* is shown in FIG. 20.

Further, as shown in FIG. 19, the electric current passing through the plate electrode 114*b* decreases from an end A toward the other end B, whereas the electric current passing through the plate electrode 116*b* increases from an end A' toward the other end B'. Therefore, for example, the plate electrode 114*b* may be shaped such that one side is a broad portion 114*c* and the other side is a thin portion 114*d* as shown in FIG. 21A, and the plate electrode 116*b* may be shaped such that one side is a thin portion 116*c* and the other side is a broad portion 116*d* as shown in FIG. 21B. In this case, as shown in FIG. 21C, in the region α where the amount of electric current passing through the first plate electrode 114*b* is larger than the amount of electric current passing through the second plate electrode 116*b*, the area of the first plate electrode 114*b* (114*c*) is larger than the area of the second plate electrode 116*b* (116*c*). However in the region β where the amount of electric current passing through the second plate electrode 116*b* is larger than the amount of electric current passing through the first plate electrode 114b, the area of the second plate electrode 116b (116d) is larger than the area of the first plate electrode 114b (114d). As such, by reducing the size of a plate electrode at a position where the amount of electric current passing through is small, it is possible to enlarge the forming region of another member such as the antenna coil 113 while keeping the electrical resistance low.

Figure 22A:
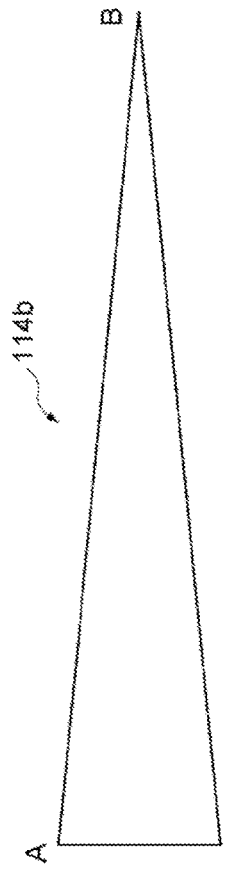
FIG. 22A to FIG. 22C are diagrams showing still another configuration of the contactless communication medium of the second modification.
Figure 22B:
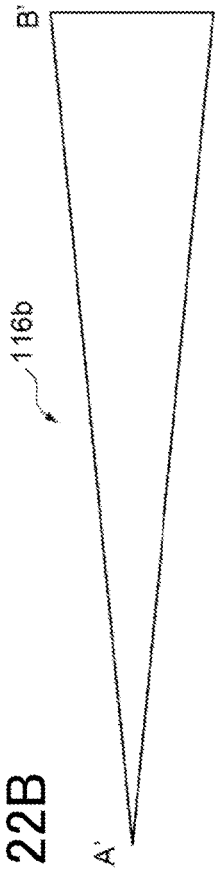
Figure 22C:
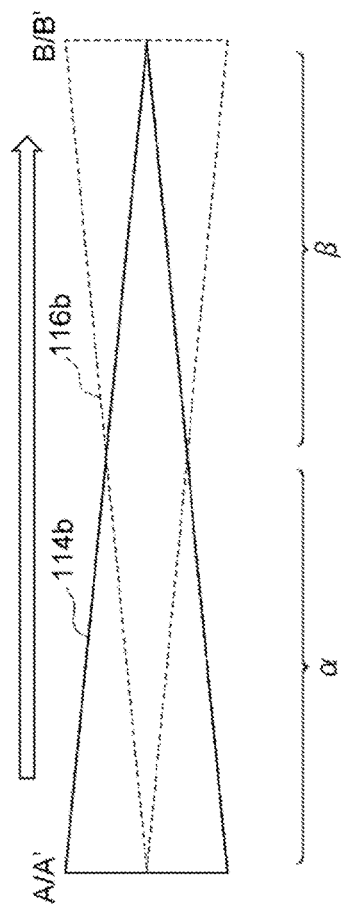

Further, shapes of the plate electrodes 114b and 116b are not limited to the above, and other shapes can be adequately selected. For example, as shown in FIG. 22A and FIG. 22B, the plate electrodes 114b and 116b may have a planar triangular shape. In this case, as shown in FIG. 22C, in the region α where the amount of electric current passing through the first plate electrode 114b is larger than the amount of electric current passing through the second plate electrode 116b, the area of the first plate electrode 114b is larger than the area of the second plate electrode 116b. However in the region β where the amount of electric current passing through the second plate electrode 116b is larger than the amount of electric current passing through the first plate electrode 114b, the area of the second plate electrode 116b is larger than the area of the first plate electrode 114b. Therefore, it is possible to enlarge the forming region of another member such as the antenna coil 113 and the like similarly as described above. Further, also in the case of the second modification, this structure may be adequately applied in the structures of the contactless communication medium of the first embodiment to the ninth embodiment described above similarly to the first modification.

The contactless communication medium of the modifications has been described, but the wireless communication medium having RFID of the modifications is not limited to the examples described above, and various modifications can be applied. For example, in the modification described above, the film base 111 is constituted by a three-layer structure. However, the present invention is not limited to a three-layer structure, and the film base 111 may be formed from a structure having 4 or more layers, each comprising a dielectric. In this case, it is possible to more finely adjust the capacitances of the capacitors constituted by the first and second plate electrodes 114a, 114b, 116a, and 116b. Further, in the example described above, 2 capacitors were formed with the first and second plate electrodes 114a, 114b, 116a, and 116b and both terminals of the antenna coil 113 were conducted. However, it is only necessary that at least one of the 2 has a capacitor structure, and the other electrode may be directly conducted.

Appendices will be provided regarding the contactless communication mediums (contactless information medium) described in modifications 1 and 2 and the like described above.

APPENDIX 1

A contactless information medium comprising:
a film base comprising a dielectric;
an antenna coil disposed on at least one surface of the film base;
an IC chip performing wireless communication processing via the antenna coil;
a first plate electrode disposed on the one surface of the film base; and
a second plate electrode disposed on the other surface of the film base so as to be opposite to the first plate electrode in the thickness direction with the film base therebetween, wherein the film base has an intermediate base comprising a dielectric, a first dielectric layer for adjustment comprising a dielectric and formed on one surface of the intermediate base, and a second dielectric layer for adjustment comprising a dielectric and formed on the other surface of the intermediate base.

APPENDIX 2

The contactless information medium according to Appendix 1, wherein the dielectric constants of the dielectrics constituting the first and second dielectric layers for adjustment are greater than or equal to the dielectric constant of the dielectric constituting the intermediate base.

APPENDIX 3

The contactless information medium according to Appendix 1 or 2, wherein the thickness of the first and second dielectric layers for adjustment is less than the thickness of the intermediate base.

APPENDIX 4

The contactless information medium according to any one of Appendices 1 to 3, wherein the dielectric material constituting the first and second dielectric layers for adjustment is different from the dielectric material constituting the intermediate base.

APPENDIX 5

The contactless information medium according to any one of Appendices 1 to 4, wherein the thickness of a metal foil constituting the antenna coil is greater than the thickness of a metal foil constituting the second plate electrode.

APPENDIX 6

The contactless information medium according to any one of Appendices 1 to 5, wherein the first and second dielectric layers for adjustment are formed by applying the dielectric material to the intermediate base followed by curing.

APPENDIX 7

The contactless information medium according to any one of Appendices 1 to 6, wherein the area of the second plate electrode in the plane is larger than the area of the first plate electrode in the plane, and the first plate electrode is surrounded by the second plate electrode when viewed in the direction perpendicular to the plane of the first and second plate electrodes.

APPENDIX 8

The contactless information medium according to any one of Appendices 1 to 6, wherein the area of the first plate electrode in the plane is larger than the area of the second plate electrode in the plane, and the second plate electrode is surrounded by the first plate electrode when viewed in the direction perpendicular to the plane of the first and second plate electrodes.

APPENDIX 9

The contactless information medium according to any one of Appendices 1 to 6, wherein the first and second plate electrodes are formed on a flow path of an electric current passing through the antenna coil and constitute a portion of a coil pattern, are formed such that the area of the second plate electrode is larger than the area of the first plate electrode in a region where the amount of electric current flowing through the second plate electrode is larger than the amount of electric current flowing through the first plate electrode, and are formed such that the area of the first plate electrode is larger than the area of the second plate electrode in a region where the amount of electric current flowing through the first plate electrode is larger than the amount of electric current flowing through the second plate electrode.

APPENDIX 10

The contactless information medium according to any one of Appendices 1 to 6, wherein the first and second plate electrodes are formed on a flow path of an electric current passing through the antenna coil and constitute a portion of a coil pattern, are formed such that the area of the second plate electrode is larger than the area of the first plate electrode in a region where an average electric current density in an electrode cross section of the second plate electrode is larger than an average electric current density in an electrode cross section of the first plate electrode, and are formed such that the area of the first plate electrode is larger than the area of the second plate electrode in a region where an average electric current density in an electrode cross section of the first plate electrode is larger than an average electric current density in an electrode cross section of the second plate electrode.

Effects and functions of the contactless information medium according to Appendix 1 to Appendix 10 will now be described.

In the contactless information medium of Appendix 1, the film base sandwiched between the first and second plate electrodes has at least a three-layer structure of the intermediate base and the first and second dielectric layers for adjustment. This configuration enables easier adjustment of the thickness of the film base including a dielectric, that is, the separation distance between the first and second plate electrodes by, for example, changing the thickness of the first or second dielectric layer for adjustment. Consequently, the capacitance of the capacitor made of the first and second plate electrodes can be easily adjusted without changing the shape and the like of the electrode pattern of the plate electrodes constituting the capacitor. Further, in the contactless information medium, an electrical connection is made with a capacitor formed by the first plate electrode connected to the antenna coil and the second plate electrode disposed on the rear surface. This configuration enables simpler production and inspection processes than if the start end and the finish end of the antenna coil were directly connected to the conductor pattern on the rear surface, and a more reliable electrical connection.

In the contactless information medium of Appendix 2, even when the thickness of the first and second dielectric layers for adjustment is small, the capacitance of the capacitor formed of the first and second plate electrodes can be easily adjusted.

In the contactless information medium of Appendix 3, the dielectric layer for adjustment for adjusting the capacitance of the capacitor made of the first and second plate electrodes can be made thin, and therefore it is possible to control the variance in total thickness of a film base in each product.

In the contactless information medium of Appendix 4, the dielectric material constituting the first and second dielectric layers for adjustment may be different from or the same as the dielectric material constituting the intermediate base.

In the contactless information medium of Appendix 5, electrical resistance of the antenna coil can be reduced, and therefore it is possible to improve the radiation efficiency of an antenna of the contactless information medium.

In the contactless information medium of Appendix 6, thickness and the like of the first and second dielectric layers for adjustment can be easily adjusted, and therefore it is possible to easily adjust the capacitance of the capacitor made of the first and second plate electrodes.

According to the contactless information medium of Appendix 7, when forming each of the first and second plate electrodes on either surface of a base film, a position and the like of the plate electrodes may be misaligned from designed values due to production errors and the like. By adopting the structure described above, even in the case where the arrangement positions of the first and second plate electrodes are somewhat misaligned from the designed values, it is possible to have a capacitor with a predetermined capacitance. Further, to the contrary, as in the case of Appendix 8, it is possible to have the area of the first plate electrode in the plane larger than the area of the second plate electrode in the plane, and the second plate electrode surrounded by the first plate electrode when viewed in the direction perpendicular to the plane of the first and second plate electrodes. However, the antenna coil is also formed on the same side as the first plate electrode, and therefore, by making the size of the second plate electrode larger, the contactless information medium as a whole is likely to be downsized.

In the contactless information medium of Appendices 9 and 10, when the first and second plate electrodes are formed on a flow path of an electric current passing through the antenna coil and constitute a portion of a coil pattern, the plate electrodes can be used as a portion of the antenna coil, and with a limited antenna forming region, it is possible to increase the number of coil turns and concurrently increase the opening area of the antenna. Further, by reducing the size of the plate electrodes at a position where a flow of electric current is small, it is possible to enlarge a formation region of another member such as an antenna coil and the like.

INDUSTRIAL APPLICABILITY

The present invention provides a contactless information medium having parallel plate electrodes and designed to have an opening of an antenna coil.

REFERENCE SIGNS LIST 10, 20, 30, 40, 50, 60, 70, 80, 90 . . . Contactless communication medium (Contactless information medium); 11 . . . Film base; 12 . . . IC chip; 13 . . . IC chip mounting portion; 14, 81 . . . Antenna coil; 15, 16, 41, 42, 51, 52, 61, 62, 71, 82, 83, 92, 93 . . . First plate electrode; 17, 18, 43, 44, 53, 54, 63, 64, 72, 84, 85, 94, 95 . . . Second plate electrode; 19, 21, 45, 55, 65, 73, 86, 96 . . . Jumper wire

What is claimed is:

1. A contactless information medium comprising:
   a film base;
   an antenna coil disposed on a first surface of the film base, and formed in a spiral shape to perform wireless communication with an external device;
   an IC chip disposed on the first surface of the film base, connected to the antenna coil via an IC chip mounting portion, and performing wireless communication processing via the antenna coil;

a first plate electrode disposed on the first surface of the film base, and connected to at least one of an inner end and an outer end of the antenna coil; and a second plate electrode disposed on a second surface of the film base so as to be opposite to the first plate electrode in a thickness direction of the film base, wherein each of the first plate electrode and the second plate electrode has a first electrode portion and a second electrode portion each extending along a first side direction of the antenna coil and a second side direction intersecting the first side direction so as to be adjacent to an inner periphery or an outer periphery of the antenna coil when viewed perpendicular to the film base, or is disposed along greater than or equal to one-third of the entire length of the inner periphery or the outer periphery of the antenna coil so as to be adjacent to the inner periphery or the outer periphery of the antenna coil when viewed perpendicular to the film base and wherein the first plate electrode has a first inner plate electrode connected to the inner end of the antenna coil, and a first outer plate electrode connected to the outer end of the antenna coil, the second plate electrode has a second inner plate electrode opposite to the first inner plate electrode in the thickness direction of the film base, and a second outer plate electrode opposite to the first outer plate electrode in the thickness direction of the film base, and wherein either a) the first outer plate electrode is disposed on the opposite side of the first inner plate electrode with respect to a center point or center line on a plane of the film base or b) each of the first inner plate electrode and the first outer plate electrode has the first electrode portion and the second electrode portion.

2. The contactless information medium of claim 1, wherein:

the first outer plate electrode is disposed on the opposite side of the first inner plate electrode with respect to a center point or center line on a plane of the film base.

3. The contactless information medium of claim 2, wherein the contactless information medium comprises a jumper portion connecting the second inner plate electrode and second outer plate electrode on the second surface of the film base.

4. The contactless information medium of claim 2, wherein a pair of inner plate electrodes comprising the first inner plate electrode and the second inner plate electrode, and a pair of outer plate electrodes comprising the first outer plate electrode and the second outer plate electrode are arranged such that, when viewed perpendicular to the film base, a portion of the antenna coil along which the pair of inner plate electrodes are disposed is different from a portion of the antenna coil along which the pair of outer plate electrodes are disposed.

5. The contactless information medium of claim 2, wherein at least one of the pair of inner plate electrodes comprising the first inner plate electrode and the second inner plate electrode and the pair of outer plate electrodes comprising the first outer plate electrode and the second outer plate electrode are arranged such that an electric current flows along the same direction as an electric current passing through the antenna coil.

6. The contactless information medium of claim 1, wherein:

each of the first inner plate electrode and the first outer plate electrode has the first electrode portion and the second electrode portion.

7. The contactless information medium of claim 1, wherein the antenna coil is formed in any one of a polygonal shape including a rectangular shape, a circular shape, and an elliptical shape.

8. The contactless information medium of claim 1, wherein the IC chip mounting portion is disposed outside the antenna coil when viewed perpendicular to the film base.

9. The contactless information medium of claim 1, wherein:

the IC chip mounting portion is disposed outside the antenna coil when viewed perpendicular to the film base, and the pair of outer plate electrodes comprising the first outer plate electrode and the second outer plate electrode are disposed along the outer periphery of the antenna coil and the IC chip mounting portion when viewed perpendicular to the film base.

10. The contactless information medium of claim 1, wherein the first plate electrode and the second plate electrode are disposed on the film base such that, when viewed perpendicular to the film base, either one of the plate electrodes entirely covers the other plate electrode.

11. The contactless information medium of claim 1, wherein the first plate electrode and the second plate electrode are disposed on the film base such that, when viewed perpendicular to the film base, either one of the plate electrodes entirely covers the other plate electrode in a first direction parallel to the surface of the film base, and the latter plate electrode entirely covers the former plate electrode in a second direction parallel to the surface of the film base and perpendicular to the first direction.

12. The contactless information medium of claim 1, wherein an antenna arranging region where the antenna coil is arranged is defined in a frame shape on a periphery side of the first surface of the film base, and the antenna arranging region is provided between the outer periphery of the film base and an antenna non-arranging region covering about more than half of the entire area of the first surface and defined in a central portion of the first surface.

13. The contactless information medium of claim 1, wherein the first plate electrode is disposed adjacent to the antenna coil such that a spacing between the first plate electrode and the closest inner periphery or the closet outer periphery of the antenna coil is 0.5 mm or less.

14. The contactless information medium of claim 1, wherein the film base has an intermediate base comprising a dielectric, a first dielectric layer for adjustment comprising a dielectric and formed on a first surface of the intermediate base, and a second dielectric layer for adjustment comprising a dielectric and formed on a second surface of the intermediate base.

15. The contactless information medium of claim 14, wherein dielectric constants of the dielectrics constituting the first and second dielectric layers are greater than or equal to a dielectric constant of a dielectric constituting the intermediate base.

16. The contactless information medium of claim 15, wherein a total thickness of the first and second dielectric layers is less than a thickness of the intermediate base.

17. The contactless information medium of claim 16, wherein dielectric materials constituting the first and second dielectric layers are different from a dielectric material constituting the intermediate base.

18. The contactless information medium of claim 17, wherein the first and second dielectric layers are formed by applying a dielectric material to the intermediate base, followed by curing.

19. The contactless information medium of claim 1, wherein a thickness of a metal foil constituting the antenna coil is greater than a thickness of a metal foil constituting the second plate electrode.

20. A contactless information medium comprising:
a film base;
an antenna coil disposed on a first surface of the film base, and formed in a spiral shape to perform wireless communication with an external device;
an IC chip disposed on the first surface of the film base, connected to the antenna coil via an IC chip mounting portion, and performing wireless communication processing via the antenna coil;
a first plate electrode disposed on the first surface of the film base, and connected to at least one of an inner end and an outer end of the antenna coil; and
a second plate electrode disposed on a second surface of the film base so as to be opposite to the first plate electrode in a thickness direction of the film base,
wherein each of the first plate electrode and the second plate electrode
has a first electrode portion and a second electrode portion each extending along a first side direction of the antenna coil and a second side direction intersecting the first side direction so as to be adjacent to an inner periphery or an outer periphery of the antenna coil when viewed perpendicular to the film base, or
is disposed along greater than or equal to one-third of the entire length of the inner periphery or the outer periphery of the antenna coil so as to be adjacent to the inner periphery or the outer periphery of the antenna coil when viewed perpendicular to the film base and wherein:
wherein:
the IC chip mounting portion is disposed outside the antenna coil when viewed perpendicular to the film base, and
the pair of outer plate electrodes comprising the first outer plate electrode and the second outer plate electrode are disposed along the outer periphery of the antenna coil and the IC chip mounting portion when viewed perpendicular to the film base.

21. A contactless information medium comprising:
a film base;
an antenna coil disposed on a first surface of the film base, and formed in a spiral shape to perform wireless communication with an external device;
an IC chip disposed on the first surface of the film base, connected to the antenna coil via an IC chip mounting portion, and performing wireless communication processing via the antenna coil;
a first plate electrode disposed on the first surface of the film base, and connected to at least one of an inner end and an outer end of the antenna coil; and
a second plate electrode disposed on a second surface of the film base so as to be opposite to the first plate electrode in a thickness direction of the film base,
wherein each of the first plate electrode and the second plate electrode
has a first electrode portion and a second electrode portion each extending along a first side direction of the antenna coil and a second side direction intersecting the first side direction so as to be adjacent to an inner periphery or an outer periphery of the antenna coil when viewed perpendicular to the film base, or
is disposed along greater than or equal to one-third of the entire length of the inner periphery or the outer periphery of the antenna coil so as to be adjacent to the inner periphery or the outer periphery of the antenna coil when viewed perpendicular to the film base and wherein the film base has an intermediate base comprising a dielectric, a first dielectric layer for adjustment comprising a dielectric and formed on a first surface of the intermediate base, and a second dielectric layer for adjustment comprising a dielectric and formed on a second surface of the intermediate base.

22. The contactless information medium of claim 21, wherein dielectric constants of the dielectrics constituting the first and second dielectric layers are greater than or equal to a dielectric constant of a dielectric constituting the intermediate base.

23. The contactless information medium of claim 22, wherein a total thickness of the first and second dielectric layers is less than a thickness of the intermediate base.

24. The contactless information medium of claim 23, wherein dielectric materials constituting the first and second dielectric layers are different from a dielectric material constituting the intermediate base.

25. The contactless information medium of claim 24, wherein the first and second dielectric layers are formed by applying a dielectric material to the intermediate base, followed by curing.

* * * * *